United States Patent
Wiest et al.

(10) Patent No.: US 11,537,134 B1
(45) Date of Patent: Dec. 27, 2022

(54) GENERATING ENVIRONMENTAL INPUT ENCODING FOR TRAINING NEURAL NETWORKS

(71) Applicant: Apple Inc., Cupertino, CA (US)

(72) Inventors: Juergen Wiest, Stäfa (CH); Moises Goldszmidt, Palo Alto, CA (US); Tobias Martin Gindele, Pforzheim (DE)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 15/988,929

(22) Filed: May 24, 2018

Related U.S. Application Data

(60) Provisional application No. 62/511,204, filed on May 25, 2017.

(51) Int. Cl.
*G05D 1/02* (2020.01)
*G05D 1/00* (2006.01)

(52) U.S. Cl.
CPC ......... *G05D 1/0221* (2013.01); *G05D 1/0088* (2013.01)

(58) Field of Classification Search
CPC .... G05D 1/0221; G05D 1/0231; G05D 1/024; G05D 1/0214; G05D 1/0246; G05D 1/0251; G05D 1/0289; G05D 1/0088; G05D 2201/0213; G06K 9/00805; G06K 9/00798; G06K 9/00791; G06K 9/629; G06K 9/00; G06K 9/00624; G06K 9/0063; G06K 9/00671; G06K 9/209; G06K 9/3241; G06K 9/4604; G06K 9/6255; G08G 1/166; G08G 1/165; G08G 1/167; B60W 50/0097; B60W 30/0956; B60W 30/16; B60W 30/00; B60W 30/09; B60W 30/10

USPC ...... 701/27, 23, 301, 70, 302, 408; 340/435, 340/438, 903, 988; 382/103, 104, 201
See application file for complete search history.

(56) References Cited

U.S. PATENT DOCUMENTS

| | | | | |
|---|---|---|---|---|
| 8,531,293 B2 * | 9/2013 | Putz | ...................... | G08B 31/00 340/541 |
| 8,538,675 B2 * | 9/2013 | Richardson | ........ | G06K 9/00785 701/301 |
| 8,605,947 B2 * | 12/2013 | Zhang | ................... | G08G 1/167 382/104 |
| 8,706,298 B2 * | 4/2014 | Goulding | ............. | G05D 1/0088 700/251 |

(Continued)

OTHER PUBLICATIONS

Kihyuk Sohn, et al., "Learning Structured Output Representation using Deep Conditional Generative Models", Advances in Neural Information Processing Systems, 2015, pp. 3483-3491.

(Continued)

*Primary Examiner* — Richard A Goldman
(74) *Attorney, Agent, or Firm* — Robert C. Kowert; Kowert, Hood, Munyon, Rankin & Goetzel, P.C.

(57) ABSTRACT

An encoding of an environment for operating vehicles is obtained, comprising a combination of at least a representation of moving entities with a graph representation of static infrastructure elements. Using the encoding and a set of one or more observations of the environment state, a machine learning model is trained to produce a probabilistic representation of a set of predicted states of the environment. A trained version of the machine learning model is stored and deployed at one or more vehicles to help plan and control vehicle movements.

20 Claims, 11 Drawing Sheets

(56) References Cited

U.S. PATENT DOCUMENTS

| | | | | |
|---|---|---|---|---|
| 8,903,588 | B2* | 12/2014 | Schmudderich | G06K 9/00798 |
| | | | | 701/23 |
| 8,912,978 | B2* | 12/2014 | Szczerba | G01S 13/931 |
| | | | | 345/7 |
| 10,345,447 | B1* | 7/2019 | Hicks | G01S 7/486 |
| 10,394,243 | B1* | 8/2019 | Ramezani | B60W 60/0015 |
| 10,482,572 | B2* | 11/2019 | Hotson | G06K 9/00 |
| 2002/0072869 | A1* | 6/2002 | Stiller | G01C 25/00 |
| | | | | 702/90 |
| 2010/0191391 | A1* | 7/2010 | Zeng | G01S 13/87 |
| | | | | 701/1 |
| 2010/0228476 | A1* | 9/2010 | Bar-Zeev | G01C 21/20 |
| | | | | 701/533 |
| 2010/0253493 | A1* | 10/2010 | Szczerba | G01S 13/723 |
| | | | | 340/435 |
| 2010/0253539 | A1* | 10/2010 | Seder | G01S 13/87 |
| | | | | 340/903 |
| 2011/0190972 | A1* | 8/2011 | Timmons | G08G 1/166 |
| | | | | 701/31.4 |
| 2013/0210405 | A1* | 8/2013 | Whipple | H04W 4/027 |
| | | | | 455/418 |
| 2014/0064624 | A1* | 3/2014 | Kim | G06K 9/6211 |
| | | | | 382/201 |
| 2016/0174902 | A1* | 6/2016 | Georgescu | G06T 7/0012 |
| | | | | 600/408 |
| 2017/0116487 | A1* | 4/2017 | Yamazaki | G06T 7/285 |
| 2017/0308092 | A1* | 10/2017 | Altinger | B60W 30/06 |
| 2018/0120843 | A1* | 5/2018 | Berntorp | G05D 1/0221 |
| 2018/0173240 | A1* | 6/2018 | Fang | G05D 1/0289 |
| 2018/0196416 | A1* | 7/2018 | Iagnemma | G06Q 50/30 |
| 2018/0259966 | A1* | 9/2018 | Long | G05D 1/0246 |
| 2018/0345958 | A1* | 12/2018 | Lo | G08G 1/096725 |
| 2019/0049970 | A1* | 2/2019 | Djuric | G06N 20/00 |
| 2019/0227550 | A1* | 7/2019 | Yershov | G05D 1/0088 |
| 2019/0318041 | A1* | 10/2019 | Bai | G06K 9/6278 |
| 2019/0346854 | A1* | 11/2019 | Slutsky | G01S 13/867 |
| 2019/0353778 | A1* | 11/2019 | Slutsky | G01S 13/931 |
| 2020/0258480 | A1* | 8/2020 | Bronder | G01C 21/365 |
| 2021/0024064 | A1* | 1/2021 | Nicosevici | B60W 30/0956 |
| 2021/0024095 | A1* | 1/2021 | Tao | G08G 1/163 |
| 2021/0089040 | A1* | 3/2021 | Ebrahimi Afrouzi | |
| | | | | A47L 9/2894 |
| 2021/0142526 | A1* | 5/2021 | Mantyjarvi | G06T 19/006 |
| 2021/0256276 | A1* | 8/2021 | Schnoll | G01C 21/26 |

OTHER PUBLICATIONS

Caglar Gulcehre, et al., "Learned-Norm Pooling for Deep Feedforward and Recurrent Neural Networks", Gulcehre, Caglar, et al. "Learned-norm pooling for deep feedforward and recurrent neural networks." Joint European Conference an Machine Learning and Knowledge Discovery in Databases, 2014, pp. 530-546.

David Duvenaud, et al., "Convolutional Networks on Graphs for Learning Molecular Fingerprints", Advances in neural information processing systems, 2015, pp. 2224-2232.

Yujia Li, et al., "Gated Graph Sequence Neural Networks", arXiv preprint arXiv:1511.05493, 2016, pp. 1-20.

Peter Ondruska, et al., "End-to-End Tracking and Semantic Segmentation Using Recurrent Neural Networks", arXiv preprint arXiv:1604.05091, 2016, pp. 1-9.

Yichuan Tang, et al., "Learning Stochastic Feedforward Neural Networks", In Advances in Neural Information Processing Systems, 2013, pp. 530-538.

Shaosheng Cao, et al., "Deep Neural Networks for Learning Graph Representations", Proceedings of the Thirtieth AAA Conference on Artificial Intelligence (AAAI-16), 2016, pp. 1-8.

Max Jaderberg, et al., "Reinforcement Learning with Unsupervised Auxiliary Tasks", arXiv:1611.05397v1 [cs.LG], Nov. 16, 2016, pp. 1-14.

Isaac Dykeman, "Conditional Variational Autoencoders", Retrieved from URL: http://ijdykeman.github.io/ml/2016/12/21/cvae.html on Mar. 16, 2017, pp. 1-12.

Diederik P. Kingma, et al., "Auto-Encoding Variational Bayes", arXiv:1312.6114v10 [stat.ML], May 1, 2014, pp. 1-14.

Heiga Zen, et al., "Deep Mixture Density Networks for Acoustic Modeling in Statistical Parametric Speech Synthesis", Acoustics, Speech and Signal Processing (ICASSP), 2014 IEEE International Conference on. IEEE, pp. 3844-3848.

Werner Uwents, et al., "A Comparison between Neural Network Methods for Learning Aggregate Functions", International Conference on Discovery Science, 2008, pp. 88-99.

Alberto Testolin et al., "Probabilistic Models and Generative Neural Networks: Towards an Unified Framework for Modeling Normal and Impaired Neurocognitive Functions", Frontiers in Computational Neuroscience, Published Jul. 13, 2016, pp. 1-9.

Dietmar Kasper, et al., "Object-Oriented Bayesian Networks for Detection of Lane Change Maneuvers", Intelligent Transportation Systems Magazine, Jan. 12, vol. 4, No. 1, pp. 1-10.

Wikipedia, "Mixture distribution", Retrieved from URL: https://en.wikipedia.org/wiki/Mixture_distribution on Mar. 16, 2017, pp. 1-8.

Wikipedia, "Multi-task learning", Retrieved from URL: https://en.wikipedia.org/wiki/Multitask_learning on Mar. 20, 2017, pp. 1-11.

Christopher M. Bishop, "Mixture Density Networks", Neural Computing Research Group, Dept of Computer Science and Applied Mathematics, Feb. 1994, pp. 1-26.

Julie Dequaire, et al., "Deep Tracking on the Move: Learning to Track the World from a Moving Vehicle using Recurrent Neural Networks", arXiv:1609.09365v2 [cs.CV], Feb. 9, 2017, pp. 1-8.

Eike Rehder, et al., "Goal-Directed Pedestrian Prediction", Proceedings of the IEEE International Conference on Computer Vision Workshops, 2015, pp. 1-9.

Carl Doersch, "Tutorial on Variational Autoencoders", arXiv:1606.05908v2 [stat.ML], Aug. 13, 2016, pp. 1-23.

U.S. Appl. No. 15/713,326, filed Sep. 22, 2017, Joshua D. Redding, et al.

David Silver, et al., "Mastering the Game of Go with Deep Neural Networks and Tree Search," Published in "Nature" Jan. 28, 2016, pp. 1-37.

Sebastian Brechtel, et al., "Dynamic Decision-making in Continuous Partially Observable Domains: A Novel Method and its Application for Autonomous Driving," This document is licensed under the Creative Commons Attribution 3.0 DE License, Jul. 6, 2015, pp. 1-225.

Wikipedia, "Monte Carlo tree search," https://en.wikipedia.org/wiki/Monte_Carlo_tree_search, Jul. 14, 2016, pp. 1-9.

Guillaume Chaslot, et al., "Monte-Carlo Tree Search: A New Framework for Game AI," Copyright c 2008, Association for the Advancement of Artificial Intelligence (www.aaai.org), pp. 216-217.

Douglas C. Whitaker, "A Brief Description of Monte Carlo Tree Search," Dec. 9, 2011, pp. 1-4.

* cited by examiner

GENERATING ENVIRONMENTAL INPUT ENCODING FOR TRAINING NEURAL NETWORKS

This application claims benefit of priority to U.S. Provisional Application No. 62/511,204 filed May 25, 2017, titled "State Prediction Techniques for Autonomous Vehicles," which is hereby incorporated by reference in its entirety.

BACKGROUND

Technical Field

This disclosure relates generally to systems and algorithms for decision making and motion planning with respect to controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Until relatively recently, due to the limitations of the available hardware and software, the maximum speed at which computations for analyzing relevant aspects of the vehicle's external environment could be performed was insufficient to enable non-trivial navigation decisions to be made without human guidance. Even with today's fast processors, large memories, and advanced algorithms, however, the task of making timely and reasonable decisions (which are based neither on excessively pessimistic assumptions, nor on excessively optimistic assumptions) regarding an autonomous vehicle's trajectory in the context of unpredictable behaviors of other entities (such as other drivers or other autonomous vehicles) and incomplete or noisy data about the vehicle's environment in real-world traffic remains a significant challenge.

SUMMARY OF EMBODIMENTS

Various embodiments of methods and apparatus for generating joint state predictions to be used for decision making regarding movements or trajectories of an autonomous vehicle are described. The predictions may be produced on an ongoing or continuous basis in at least some embodiments, and may for example include probability distributions with respect to actions expected to be taken by a plurality of moving entities or agents in a given driving environment over a time horizon of a selected duration (such as some number of seconds). According to at least one embodiment, at a high level a method may comprise producing an encoding of a vehicle's environment or surroundings in a format which can be used as input to one or more machine learning models such as a deep neural network (DNN) model, training the machine learning models using the encodings, deploying the trained models at a fleet of vehicles, executing the models recursively in the vehicles during driving periods to generate state predictions for various points of time in the future, and using the state predictions to plan and implement trajectories for the vehicles.

In some embodiments, generating an input encoding may, for example, comprise combining representations of a potentially varying number of moving entities with an infrastructure graph. The infrastructure graph may include a plurality of nodes representing respective infrastructure elements such as traffic signs, lane segments, walkways and the like in some embodiments. The edges of the graph may, for example, represent geometric or topological constraints (such as lane permeability) with respect to the nodes. Attributes of nodes may include, for example, speed limits, while attributes of edges may include, for example, rules regarding giving way to other vehicles when changing lanes. Dynamic or moving entities may be added to the input encoding using a variety of techniques in different embodiments, such as using padded vectors which allow up to a pre-selected maximum number of moving entities to be represented (where the pre-selection may be performed based on a selected metric or function), a mapping or embedding technique in which respective representations of the moving entities are mapped from a source space to a target space with a different dimensionality than the source space, using an aggregation layer or recurrent connections of a neural network model for the moving entities, and so on. In at least some embodiments, individual ones of the moving entities may have associated decision-makers (e.g., either humans or some set of programs running on a collection of one or more computing devices) which may be referred to as agents. As such, a 1:1 relationship may exist in a given environment between at least a subset of moving entities and agents in at least some embodiments. In at least one embodiment, the input encoding may also combine an occupancy grid map with the infrastructure graph and/or the representations of the moving entities as well as stationary objects. The occupancy grid map may represent a discretized birds-eye view of the environment in such an embodiment, within which the positions of a variety of typically stationary objects including recognized or classified objects (e.g., from a set of pre-defined objects) as well as unclassified or arbitrary objects including potential obstacles are identified. In some cases an occupancy grid map may include infrastructure elements such as road/highway lanes extracted from tactical maps. An occupancy grid map may include structured elements of the environment (such as lanes, intersections and the like) as well as unstructured elements (such as parking lots) in some embodiments.

The method may comprise, in various embodiments, training, using at least the input encodings, a neural network-based machine learning model to produce a probabilistic representation of a set of predicted states of the environment. The probabilistic representation may comprise a joint state density function in at least some embodiments. The input to the model may also include one or more observations of the environment state in various embodiments, such as either a temporal sequence of observations collected at successive selected points of time, or the most recent observation available. Input for training the model may be labeled, smoothed or transformed in other ways in an intermediary step in some embodiments. In some embodiments, the neural network-based machine learning model may comprise several logically decoupled components including a policy model predicting respective actions expected to be selected by a plurality of moving entities and a state transition model. The state transition model may predict at least some types of physical state changes in various embodiments. In some embodiments, a state transition model may include a respective transition model of one or more of: vehicles, traffic rules, traffic signals, pedestrian head orientation or pedestrian pose, and so on. Examples of physical state changes considered in the state transition model may include, among others, one or more of: a position, orientation, velocity, acceleration, current lane, or traffic light state. Trajectories, which may comprise a temporal sequence of changes in position corresponding to respective points in time, may also be included in the physical state changes considered in the state transition model in various embodiments. In one embodiment, the state transition model may also predict at least some types of changes which may not be considered physical—e.g., changes to the goals of an entity such as a driver or a pedestrian may be predicted In other embodiments, the policy model, the state transition model and/or other components of the machine learning model such as a situation or context model may not necessarily be decoupled. The output of the neural network-based machine learning model may comprise parametric probability distribution functions (pdfs) for future states in some embodiments, while in other embodiments non-parametric pdfs may be produced by the model. For example, in the parametric case, the mean and covariance of a Gaussian distribution of future states may be generated, while in the non-parametric case, samples from a predictive distribution may be generated.

The trained model may be deployed at various vehicles equipped with computing devices capable of acquiring real-time data from various vehicle sensors and other data sources, and feeding the real-time data as input to execute at least a portion of the trained model locally within the vehicle in some embodiments. The method may also include, in at least some embodiments, using the output of a trained model to generate, at a motion decision subsystem of such a vehicle, one or more motion-control directives (e.g., directives to slow down the vehicle, accelerate the vehicle, change the direction of motion of the vehicle, etc.). The motion control directives may be transmitted to one or more motion-control subsystems such as a braking subsystem or a turn management subsystem to achieve a desired trajectory for the vehicle in various embodiments. In at least some embodiments, the decision-making components of the vehicle may include a behavior planner which makes relatively long term decisions regarding the vehicle's trajectories, as well as a motion selector which make shorter-term decisions. In one such embodiment, the state predictions generated using the machine learning model may be transmitted to both the behavior planner and the motion selector, and both the components may utilize the predictions to plan and implement desired trajectories for the vehicle.

According to at least one embodiment, a system may comprise a machine learning model trainer comprising one or more computing devices. The computing devices may obtain a first encoding of a driving environment within which one or more vehicles operate, comprising for example a combination of a representation of a varying number of moving entities with an infrastructure graph. In some cases, the encoding may include an occupancy grid map as well. A machine learning model may be trained using the encoding to produce probabilistic representation of a set of predicted states of the environment. In some embodiments the machine learning model may comprise at least a policy model predicting respective actions expected to be taken or selected by a plurality of moving entities, as well as a state transition model (e.g., for predicting at least some types of physical state changes of various objects and entities). In other embodiments a single composite model which does not comprise such sub-models may be used. A trained version of the model may be stored and/or transmitted for local execution from the computing devices of the trainer to one or more vehicles in at least one embodiment. In some embodiments, the system may comprise one or more decision-making components of a particular vehicle, at which the trained model may be run to generate state predictions for various points in the future. The predictions may be used to generate various types of motion control directives in various embodiments, which may be transmitted from the decision-making components to motion control subsystems of the vehicle to achieve changes in the vehicle's position.

According to one embodiment, a non-transitory computer-accessible storage medium storing program instructions that when executed on one or more processors may implement a trainer for a machine learning model. The trainer may obtain a first encoding of a driving environment within which one or more vehicles operate, comprising a combination of a representation of a varying number of moving entities with an infrastructure graph. A machine learning model may be trained using the encoding to produce probabilistic representation of a set of predicted states of the environment. In some embodiments the machine learning model may comprise at least a policy model predicting respective actions of a plurality of moving entities and a state transition model. A trained version of the model may be stored and/or transmitted for local execution from the computing devices of the trainer to one or more vehicles in at least one embodiment, where output from the trained model may be used to generate motion-control directives to achieve desired changes to the vehicles' positions or movements.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
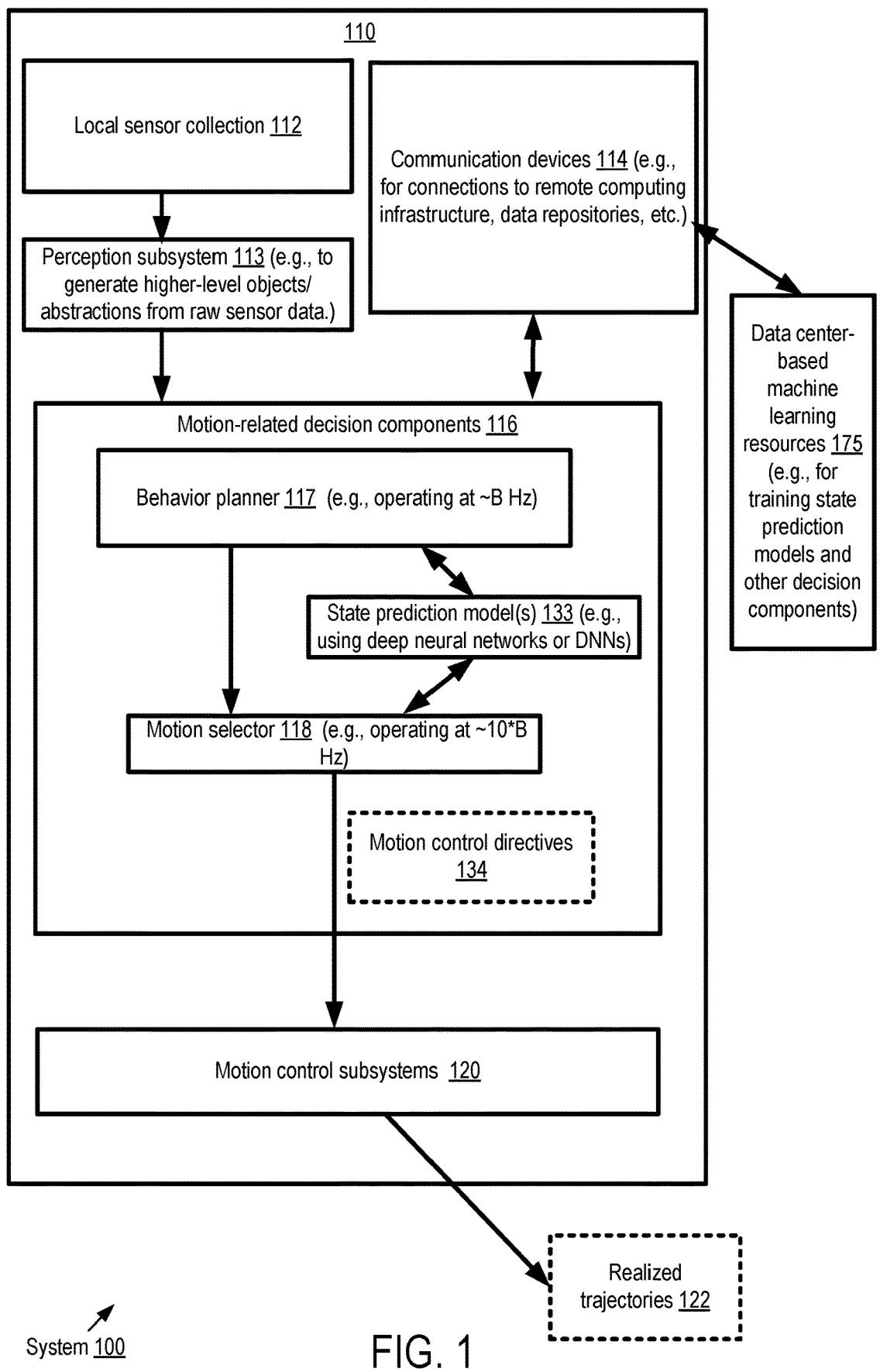
FIG. 1 illustrates an example system environment in which decision making components of an autonomous vehicle may utilize state predictions obtained from neural network models to control the trajectory of the vehicle, according to at least some embodiments.

FIG. 1 illustrates an example system environment in which decision making components of an autonomous vehicle may utilize state predictions obtained from neural network models to control the trajectory of the vehicle, according to at least some embodiments. As shown, system 100 comprises an autonomous or partially-autonomous vehicle 110. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily; furthermore, in at least one embodiment, a decision-making component of the vehicle may request or require an occupant to participate in making some decisions under certain conditions. To help introduce the algorithms which may be used for generating state predictions for planning and controlling the vehicle's movements, four types of components of the vehicle 110 are shown in FIG. 1: motion-related decision making components 116, local sensor collection 112, motion control subsystems 120 and communication devices 114. The decision making components 116 may comprise multiple tiers or layers in the depicted embodiment, including but not necessarily limited to a behavior planner 117, a motion selector 118 and state prediction model(s) 133. In the depicted embodiment, one or more of the decision making components 116 may comprise or utilize machine learning models which are generated or trained at least in part using data center-based machine learning resources 175.

The motion control subsystems 120, such as the braking system, acceleration system, turn controllers and the like may collectively be responsible for causing various types of movement changes (or maintaining the current trajectory) of vehicle 110, e.g., in response to directives or commands issued by the motion selector 118 and/or the behavior planner 117 using state predictions obtained from models 133, resulting in the actual or realized trajectory 122. In the tiered approach towards decision making illustrated in FIG. 1, the motion selector 118 may be responsible for issuing relatively fine-grained motion control directives 134 to various motion control subsystems. The rate at which directives are issued to the motion control subsystems 120 may vary in different embodiments—for example, in some implementations the motion selector 118 may issue one or more directives approximately every 100 milliseconds, which corresponds to an operating frequency of about 10 Hertz for the motion selector 118. Of course, under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision making components based on state predictions from models 133, and no new directives are needed to maintain the current velocity, the motion selector may not issue new directives every T milliseconds even though it may be capable of providing such directives at that rate.

The motion selector 118 may determine the content of the directives to be provided to the motion control subsystems (i.e., whether braking to slow speed by X units is required, whether acceleration by Y units is required, whether a turn or lane change is to be implemented, etc.) based on several inputs in the depicted embodiment, including conditional action and state sequences generated by the behavior planner 117 (as indicated by arrow 133), data obtained from sensor collection 112, and predictions of future states of the environment of the vehicle 110 generated by model(s) 133. The term "world state" may also be used to refer to the domain over which predictions are generated by model(s) 133 in various embodiments. In at least some embodiments, the world state may include a tactical/digital map, representations of the states of various other moving entities (e.g., nearby vehicles, some of which may also be autonomous or semi-autonomous) as well as stationary objects that could potentially impact the decisions to be made regarding the movements of vehicle 110. In one embodiment, the state prediction model(s) 133 may not necessarily be bundled with the behavior planner 117 and/or the motion selector 118 as part of a decision-making subsystem; instead, the state prediction model(s) 133 may be considered another example of an input source for the decision-making subsystem.

According to at least some embodiments, the task of generating model(s) 133 may involve several phases, some of which may be performed continuously or in parallel with others. For example, in various embodiments, data pertaining to the driving behavior of agents controlling vehicles (which may include human drivers as well as autonomous driving systems) under a wide variety of circumstances and external driving conditions may be collected from numerous geographical locations over months or years or on an ongoing basis, forming a potentially very large input data set for successive iterations of machine learning model improvements. Such data may be in various formats—e.g., in the form of videos or still images collected from on-vehicle cameras or stationary cameras outside vehicles, output from LIDAR (light detection and ranging) devices, radar and other types of local sensors, sensors attached to the vehicle motion control subsystems to capture braking, acceleration and turning patterns, global positioning devices, location sensors based on Wi-Fi or other signals, and so on. Data may also be collected from various databases such as law repositories for various jurisdictions in which autonomous vehicles are expected to operate, map repositories, accident report databases, motor vehicle or road management departments of governments, and so on.

In at least some embodiments, an encoding of a subset or all of such a data set may be used as input to train a state prediction model 133. The raw input information from various data sources may be logically partitioned along several different dimensions or layers to generate an encoding which is well suited for training deep neural network (DNN) based models in at least some embodiments. For example, in one embodiment, at one layer of the encoding, the environment of a vehicle 110 may optionally be discretized or represented as an occupancy grid (e.g., a grid corresponding to a birds-eye-view of an area around the vehicle). Such an occupancy grid layer may itself be composed of multiple channels or sub-layers in some cases. Within such an occupancy grid corresponding to a given point in time, the placement or position of various types of objects may be captured in various embodiments, including both classified or recognized objects as well as unclassified or unrecognized objects. The occupancy grid may be especially useful in representing objects which may correspond to obstacles in a vehicle's path, objects with arbitrary shapes, unstructured objects, and the like. In some embodiments in which an occupancy grid is used, the occupancy grid may be combined or overlaid with a second layer of the input encoding comprising a graph data structure representing relationships between various elements of the infrastructure. The nodes of the graph may represent, for example, various infrastructure elements or entities such as road lane segments, intersections, traffic signs, traffic lights/signals, pedestrian walkways and the like. An edge connecting a given pair of nodes may represent geometric or topological constraints associated with the nodes (e.g., constraints on the distances between the objects representing the nodes, the directions in which the objects are oriented with respect to each other, the heights or elevations of the objects with respect to one another, etc.) Attributes may be associated with nodes as well as with edges—for example, node attributes may include speed limits, while edge attributes may include lane permeability, or rules regarding giving way when changing lanes. The graph data structure may be used to represent dynamic as well as static elements of the infrastructure in some embodiments. The encoding of the infrastructure elements as well as the objects or entities positioned in the occupancy grid may be done on an object level in various embodiments—e.g., information about the static environment may be indicated at a much higher level of abstraction than raw pixels.

In a third layer of the input encoding, the occupancy grid and graph structure may be combined with representations of a varying number of dynamic or moving entities (e.g., the autonomous vehicle for which state information is being collected, other vehicles, pedestrians, bicyclists, and the like) in various embodiments. Individual ones of the moving entities may be represented using respective state vectors in some embodiments. Any of a number of approaches may be used towards modeling the moving entities for the purposes of providing input to a DNN model in different embodiments. For example, in one embodiment, a padded vector of state vectors capable of representing up to a selected maximum number of moving entities may be used, such that if the actual number of entities happens to be smaller than the maximum, the remaining elements of the padded vector may be set to some default values such as zero vectors. In another embodiment, an embedding or mapping of the set of moving entities from a source or initial space to a target space with a different dimensionality than the source space may be used. Such mappings/embeddings may be accomplished using, for example, a hierarchical clustering algorithm or a shared mapping/projection layer of another neural network model (different from the model that is trained using the input encoding). In some embodiments, aggregation functions (e.g., implemented using a recurrent layer of a neural network, or a pooling layer), which may or may not be invariant to a specific ordering associated with the moving entities, may be employed to incorporate representations of the moving entities into the input encoding. In some embodiments, an input encoding may include only a subset of the three layers discussed above—e.g., a combination of the graph representation with the representations of the moving entities may be used, without including the occupancy grid layer.

Using input encodings of the kind described above, one or more DNN models designed to provide probabilistic predictions regarding future world states may be trained in the depicted embodiment, e.g., at least in part using resources external to the vehicle 110 such as data center-based machine learning resources 175. The training data for the models may also include, for example, one or more observations of the environment state (e.g., a temporal sequence of observations for various points in time, or only the most recent observation), and/or representations of latent variables (such as goals of various entities) obtained from an external estimator in some embodiments. Any of a number of different stochastic and/or generative DNN architectures may be employed in different embodiments. For example, in some embodiments, a DNN model which produces parametric probability density functions (pdfs), such as a mixture density network (MDN) model which produces a mixture of Gaussians as output may be used. Other examples of mixtures of parametric distributions produced in some embodiments may include, Student-t, Poisson, Binomial, Bernoulli, and any member of the exponential family of distributions. In other embodiments, a DNN model which produces a non-parametric pdf as output may be employed, or a hybrid approach which utilizes parametric and non-parametric models for different parts of the prediction problem may be employed. Examples of the non-parametric modeling techniques which may be used in various embodiments may include, among others, conditional variational auto-encoders (CVAEs), stochastic feed-forward networks and the like.

In at least some embodiments, the problem of training models for generating world state predictions for motion-related decision making of autonomous vehicle 110 may be logically decomposed into smaller sub-problems, e.g., as discussed below in the context of FIG. 4. In one embodiment, respective smaller models corresponding to the sub-problems may be logically decoupled from one another, and at least in principle be trained separately, e.g., using respective sets of training resources 175. As such, in at least some embodiments, the training of the DNN model may comprise training a policy model (which generates predictions regarding relatively high-level actions which may be taken by relevant entities such as human or autonomous agents controlling various vehicles) and a state transition model (which generates predictions regarding at least some types of physical state changes such as the positions of various entities and objects). The state transition model may itself include several subcomponents in some embodiments, such as a kinematic subcomponent. Decoupling the DNN model in this manner may allow, for example, a variety of what-if scenarios to be analyzed after the model has been trained—e.g., different state transition models corresponding to respective vehicles or road conditions may be combined with a single policy model in some embodiments to cover a variety of possible what-if scenarios. Decoupling the models may also help in interpretation, understanding and debugging of the state prediction model as a whole in at least some embodiments. In other embodiments, a single composite or joint model may be employed instead of distinct models for policy and state transitions. A number of additional techniques may be employed to make the learning process of the DNN models 133 more effective and/or efficient in various embodiments, e.g., as discussed below in the context of FIG. 8.

After a DNN model 133 has been trained and evaluated, it may be deployed for execution at one or more autonomous vehicles 110 in the depicted embodiment. In some embodiments, a subset of the model's parameters may be left open or un-finalized at the time of deployment to an autonomous vehicle fleet; values for such parameters may be determined at the autonomous vehicle itself. In one embodiment, a plurality of distinct models 133 may be deployed at a given vehicle—e.g., with respective models intended for use in different weather conditions, different geographies, different road conditions and the like. At the vehicle, input collected from local sensors 112 and communication devices 114 may be provided to the model(s) 133 (as well as to other decision making components such as the behavior planner 117 and motion selector 118). The output predictions of the model 133 may be used at the motion selector and/or the behavior planner to generate motion control directives 134 (such as the logical equivalents of commands to "apply brakes" or "accelerate") in the depicted embodiment, which may be transmitted to the vehicle motion control subsystems 120 to achieve or realize desired movements or trajectories 122. It is noted that in one embodiment, at least a portion of the DNN model for state prediction may be trained at the autonomous vehicle itself, e.g., without requiring resources at remote data centers to be utilized.

Inputs may be collected at various sampling frequencies from individual sensors of the vehicle's sensor collection 112 in different embodiments via an intermediary perception subsystem 113 by the behavior planner 117, the motion selector 118 and/or the model(s) 133. The perception subsystem may generate higher-level objects or abstractions derived from the raw sensor data in various embodiments, which may be more appropriate for analysis by the decision components than the raw sensor data itself. In one embodiment, an intermediary perception subsystem 113 may not be required. Different sensors may be able to update their output at different maximum rates in some embodiments, and as a result the rate at which the output derived from the sensors is obtained at the various decision making components may also vary from one sensor to another. A wide variety of sensors may be included in collection 112 in the depicted embodiment, including externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices and so on. In addition to conventional video and/or still cameras, in some embodiment near-infrared cameras and/or depth cameras may be used. In one embodiment, one or more of the communication devices 114 may also play the role of a sensor—e.g., signals regarding the state and/or plans of other autonomous or non-autonomous vehicles in the vicinity may be collected via any appropriate communication protocol.

In one approach used for managing the movements of vehicle 110, the behavior planner 117 may use the state predictions of model(s) 133 to generate relatively longer-term plans comprising sequences of conditional actions and states which may be reached as a result of the actions, and provide the alternatives together with associated metadata (e.g., reward or value metrics indicating the "relative goodness" of the alternatives based on currently-known information) to the motion selector 118. The plans may be provided at a slower rate to the motion selector 118 than the rate at which directives 134 are expected to be provided to the control subsystems 120 in some embodiments (the slower rate may result, for example, from the amount of computations which have to be performed to generate the alternatives). As shown in the example of FIG. 1, the ratio of the operating frequencies of the motion selector 118 and the behavior planner 117 may be approximately 10:1 in some embodiments (e.g., if the rate at which updated action sequences are provided to the motion selector is approximately B Hertz, the rate at which directives are to be provided to the motion control subsystems may be approximately 10*B Hertz). Other frequency ratios may be used in different embodiments—the ratio shown in FIG. 1 is provided as an example and is not intended to be limiting. In some embodiments, the behavior planner 117 may utilize one or more Monte Carlo Tree Search (MCTS) algorithms to generate the plans to be provided to the motion selector. MCTS is an approach for decision making, sometimes used in automated game player systems, which combines the generality of random simulation with the precision of tree search algorithms often employed in machine learning systems.

In some embodiments, at least some of the computations involved in generating state predictions at driving time of the autonomous vehicle 110 may be performed using remote resources. The communication devices 114 (which may comprise hardware and/or software components used for wireless or telephony-based communication channels of any appropriate types) may be used to transmit and receive the data corresponding to such remote operations, to obtain updates to the models 133 and so on. The extent to which decision making is performed locally versus remotely may vary over time in some embodiments, as discussed in further detail below with respect to FIG. 10—e.g., if communication with a remote facility becomes difficult or unavailable, more decisions (of potentially lower complexity or duration) may be generated locally temporarily, until communication quality is restored. In one embodiment, regardless of whether decisions are generated at least in part locally or not, the communication devices 114 may be used to transmit data about the vehicle's state (and/or local actions taken in various states) to a remote data repository, where the data may later be analyzed and utilized to enhance the DNN model(s) 133.

Before providing a given plan comprising a sequence of actions to the motion selector, in at least one embodiment the acceptability of the proposed sequence may be verified by behavior planner 117, e.g., also based at least in part on state predictions generated by model(s) 133. The acceptance criteria used may include, for example, whether the plan is likely to lead to a timely arrival at a targeted destination of the journey being undertaken, whether the plan is dynamically feasible, whether applicable traffic rules are followed in the plan, and/or whether the proposed plan is likely to lead to a comfortable transportation experience for vehicle occupants. One or more reward functions and/or value functions (which may recursively aggregate rewards for several states or actions of a proposed sequence) may be used to compare alternative plans in different embodiments based on quantitative assessments of similar factors. Rewards and/or value functions may also take social interactions into account in at least some embodiments—e.g., if a particular action A1 (such as suddenly switching a lane to move in front of another vehicle, or passing a bicycle with a very small clearance) is likely to induce negative feelings or negative social reactions among individuals outside (or inside) the vehicle, a plan which contains action A1 may be assigned a lower value than a plan which excludes A1 (all other factors being equal).

Figure 2:
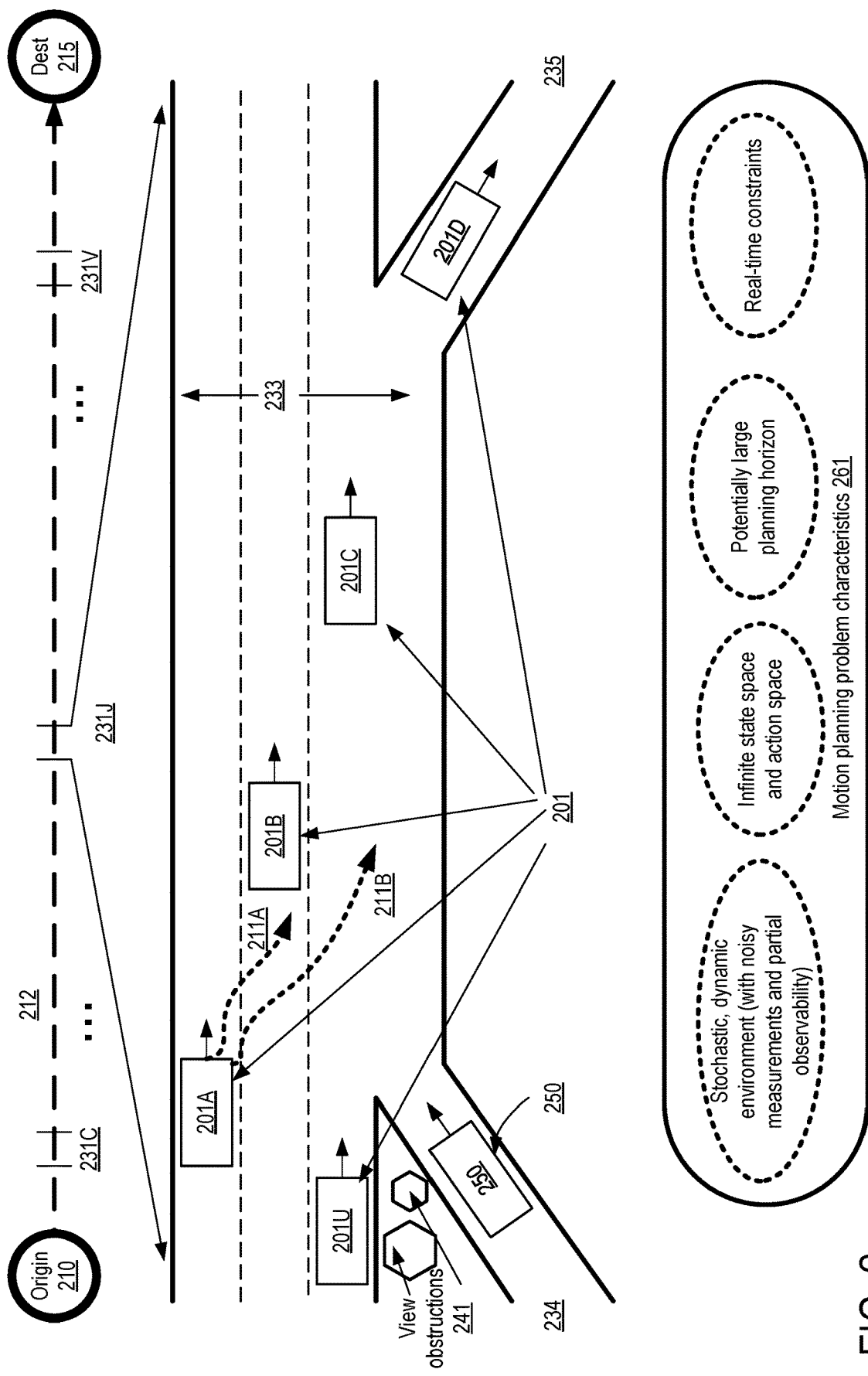
FIG. 2 illustrates an example decision making scenario for an autonomous vehicle, as well as general problem characteristics associated with such decision making scenarios, according to at least some embodiments.

FIG. 2 illustrates an example decision making scenario for an autonomous vehicle, as well as general problem characteristics associated with such decision making scenarios, according to at least some embodiments. A high-level overall route 212 for an autonomous vehicle 250 from an origin 210 to a destination 215 (labeled "Dest" in FIG. 2) may be identified prior to the start of a journey. The high-level route 212 may, for example, be identified using a network-accessible mapping service, and may comprise information such as a proposed set of highways/roads, the exits and entrances to be used for the highways/roads, and so on. In some cases the high-level route 212 may also comprise an estimated or targeted arrival time at the destination 215. The route 212 may comprise numerous subportions or segments 231, such as segments 231C, 231J and 231V. A given segment 231 may represent, for example, an entrance or turn onto some road or highway, some driving distance on the road or highway, and so on.

In the depicted example, route segment 213J comprises the use of an entrance ramp 234 by autonomous vehicle to merge into a multi-lane road 233 (the dashed lines indicate lane boundaries). An exit ramp 235 is located within a short distance of the entrance ramp 234 in the example. A number of other vehicles 201 (of which zero or more may be autonomous vehicles), such as vehicles 201A, 201B, 201C, 201D and 201U may be using the road 233 at or just before vehicle 250 is to enter the road, and may be close enough to the entrance ramp to be considered pertinent to the motion decisions made for vehicle 250. The general directions of motion of the vehicles 201 and 250 are indicated by the arrows—e.g., most of the vehicles shown are assumed to be generally proceeding from left to right in the view shown in FIG. 2. The decisions which need to be made with respect to autonomous vehicle 250 may include, for example, the speed at which the road should be entered, how long the vehicle 250 should remain in any given lane immediately after entering the road, whether and to what extent the vehicle's speed should be changed after the entrance, and so on.

Although experienced human drivers may find these kinds of decisions fairly straightforward to make, the task of automating such decisions in a timely and safe manner may be complicated. The general problem of making motion-related decisions for the autonomous vehicle may be summarized as follows. Given some level of understanding or knowledge about the "world" (the nearby environment of the vehicle 250, as well as the properties of the vehicle's current position and movements), and given information about the destination 215 (including the high-level route 212), the decision making components of the vehicle 250 may be required to produce a sequence of trajectories for the vehicle that (a) arrive at the destination safely in a timely and efficient manner (e.g., meeting some desired fuel or battery usage targets), (b) are dynamically feasible (e.g., comply with various applicable physical laws), (c) follow traffic rules, and (d) provide a comfortable experience for the vehicle's occupants. In order to achieve such goals, in at least some embodiments neural network-based models of the kind discussed in the context of FIG. 1 may be used to forecast future states of the world at selected time horizons.

A number of problem characteristics 261 which tend to make the decision making for autonomous vehicles challenging are indicated in FIG. 2. First, the dynamically changing environment of vehicle 250 may be inherently stochastic rather than deterministic, with noisy rather than full and accurate data (such as velocity, position, or heading) available with respect to other vehicles 201 and other relevant objects (such as debris in the road, potholes, signs, etc.). In some cases, one or more objects 241 may partially block a view of the road. As a result, one or more vehicles such as 201U may be partially or fully unobserved during the time period in which the merge-related decisions for vehicle 250 may have to be made. Furthermore, the intentions or goals of other agents (e.g., the drivers of vehicles 201, or the decision making components of those vehicles 201 which happen to be automated vehicles) may be unknown and difficult to predict. For example, even if the current position and velocity of vehicle 201A is known, the agent controlling vehicle 201A may suddenly change vehicle 201A's trajectory to a different lane, as indicated by arrows 211A and 211B, and such a transition may affect the decisions made on behalf of autonomous vehicle 250. Second, many of the metrics or observations which may need to be considered when making the decisions, such as the velocities and relative distances between various vehicles, their relationships to nearby elements of the infrastructure or environment, and so on, may take on continuous rather than discrete values, resulting in a theoretically infinite feasible space of possible states and actions.

The number of sequential actions which may need to be planned may be quite large, resulting in potentially large planning horizons. In principle, to achieve optimal decisions (where the definition of optimality may itself be non-trivial), individual actions and corresponding achievable states may have to be evaluated relative to one another with respect to the goals of the journey, and such comparisons may become computationally intractable depending on the number of alternatives being considered at each stage. Finally, because the vehicle 250 is moving, with a high (and therefore potentially dangerous) level of kinetic energy, the decisions may have to be made within tight real-time constraints, using limited computational resources. These characteristics, taken together, may make motion planning for autonomous vehicles an extremely difficult proposition, which may require a variety of algorithms to be utilized in combination as discussed below.

Figure 3:
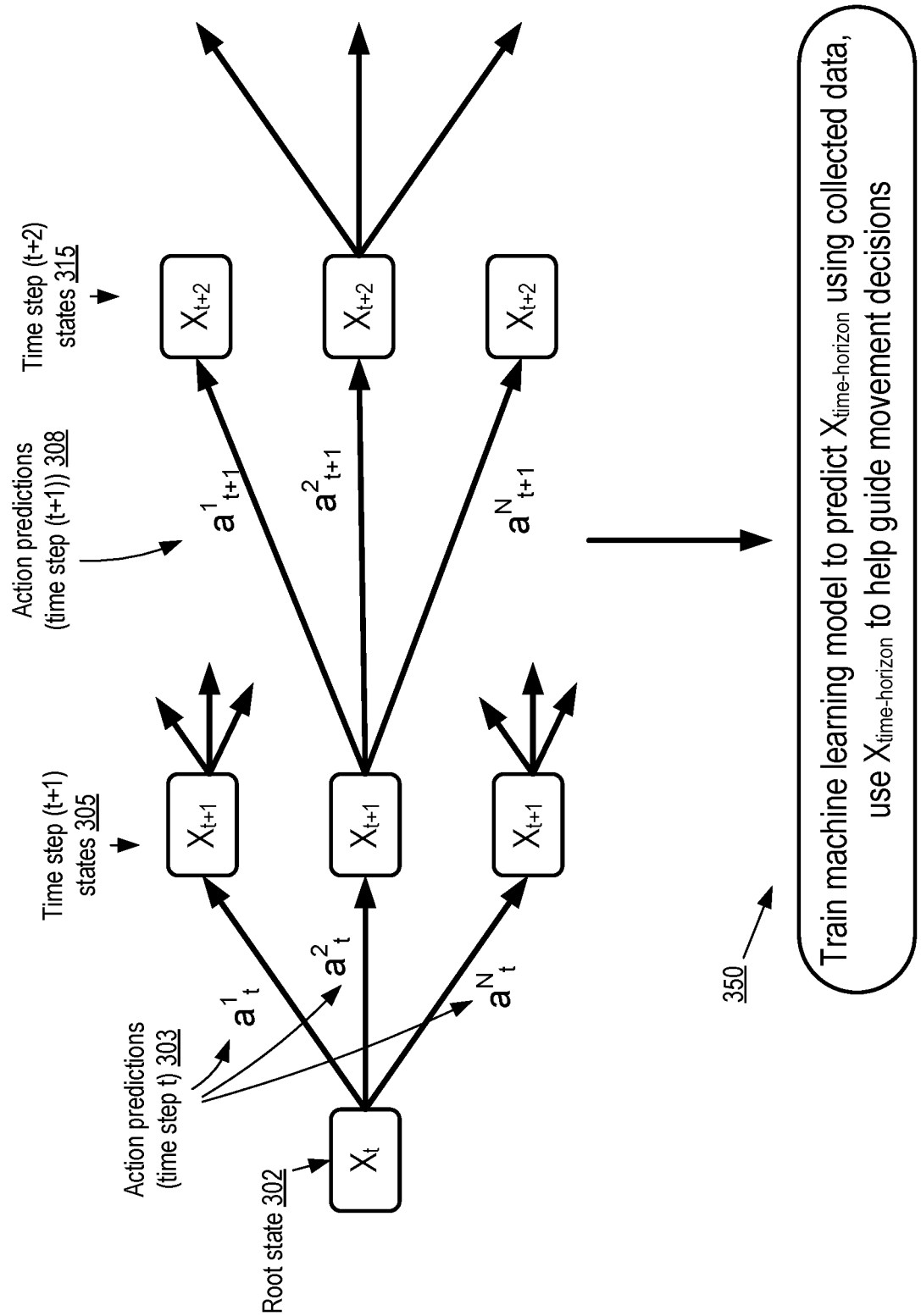
FIG. 3 provides an overview of an example probabilistic state transition graph associated with an autonomous vehicle, according to at least some embodiments.

FIG. 3 provides an overview of an example probabilistic state transition graph associated with an autonomous vehicle, according to at least some embodiments. In the depicted embodiment, the joint world state (i.e., the state of the set of entities considered relevant to the decision making guiding a given vehicle's movements) at a time t is indicated by the symbol $X_t$. The joint world state may also include a tactical map in at least some embodiments. From a given initial or root state 302 such as $X_t$, an agent (e.g., the decision making components of an autonomous vehicle, or a human driving a vehicle) may decide to take any of several possible actions such as $a^1_t$ through $a^N_t$, each of which may have an associated predicted probability 303. Depending on the specific action selected, a respective state 305 $X_{t+1}$ corresponding to the next time step (t+1) may be reached, and each such state may have several possible actions which could be taken from it at that next time step. Even if a relatively small set of feasible actions and a reasonably short time horizon (a small number of time steps) is considered, the set of possible paths in the state transition graph may quickly grow very large.

As mentioned earlier, the decision making process for autonomous vehicles may be engineered or designed to help make safe decisions and achieving anticipatory driving behavior given the complex and rapidly changing environment. In at least some embodiments, a Markov decision process (MDP) may provide a mathematical framework to model this reasoning process, and state predictions generated using models of the kind discussed above may play a crucial role in such processes. A reward function $R(X_t, X_{t+1}, a_t)$ may be computed at various time steps (e.g., by a behavior planner component of an autonomous vehicle) to determine the best action sequence or policy to be employed in at least one embodiment. A probability density function for the state estimate $X_{t+1}$ at time step t+1 may be represented by the state transition function $p(X_{t+1}|X_{0:t}, a_t)$. Such a probability density function may be used to predict the future state $X_{t+1}$ based on all previous states $X_{0:t}$ and the action at the current time of the agent associated with the autonomous vehicle being considered. As indicated in element 350 of FIG. 3, one of the enablers for successful deployment of autonomous vehicles in various embodiments may comprise training a machine learning model to predict joint world state $X_{time-horizon}$ (for one or more selected time horizons) based on collected data from real-world environments, and then to use the predicted state to guide the selection of appropriate vehicle movements or trajectories.

Figure 4:
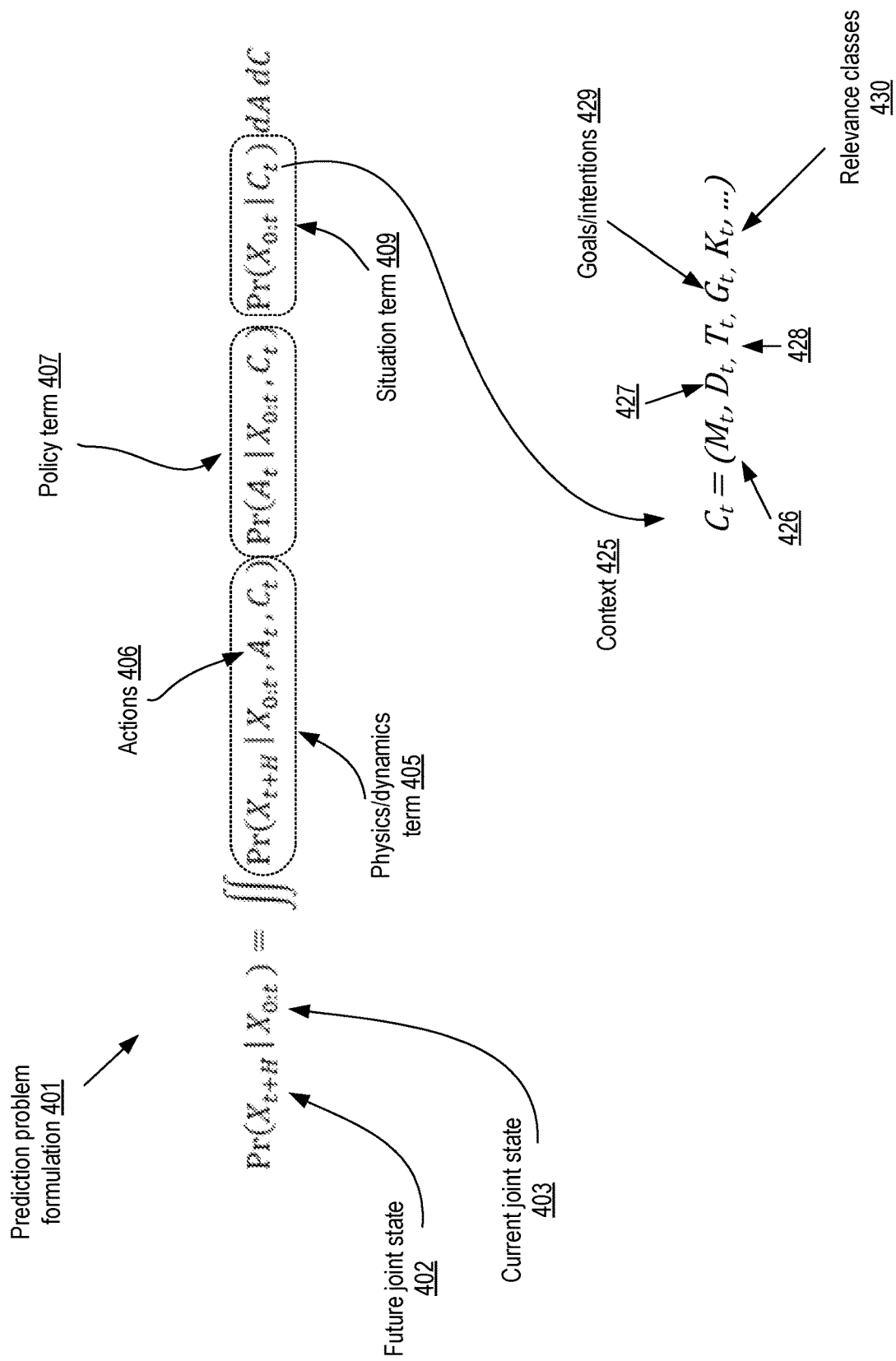
FIG. 4 illustrates an example mathematical formulation of a general state prediction problem for an autonomous vehicle, according to at least some embodiments.

FIG. 4 illustrates an example mathematical formulation of a general state prediction problem for an autonomous vehicle, according to at least some embodiments. In the depicted embodiment, the probability of reaching a future joint world state $X_{t+H}$ at a time horizon t+H (H units or steps of time in the future from the current time t), given the current world state at time t including the past states from some selected point in time designated as time zero ($X_{0:t}$) is expressed as an integral of a combination of three terms: a physics/dynamics term 405, a policy term 407, and a situation or context term 409. In the formulation 401 of the depicted embodiment, the term $X_{0:t}$ denotes information about the current state (at time t) and previous states (starting from some initial state represented by time zero) of the "world" environment affecting the vehicle, including numerous moving entities agents, as well as stationary objects. This may include, for example, time-varying states such as the moving entities' kinematics (position, orientation, velocity, acceleration etc.) with associated uncertainties, augmented by time-varying object appearances (such as changing brake lights, turn indicators, head or body orientations or postures of drivers or passengers, traffic light states, and so on). In some embodiments, $X_{0:t}$ may comprise a sequence of the past motion states (from time zero through time t), while in other embodiments the information regarding past states may be assumed to be accumulated in the state at time t.

The term $A_t$ denotes the actions taken by various agents at time t (as represented in some selected action space or framework) in the depicted embodiment, while the term $C_t$ represents several external aspects the context of the autonomous vehicle (for which motion-related decisions are to be made) are to be at time t. As indicated by element 425, the context itself may be a composite of several time-varying elements, including but not necessarily limited to map data $M_t$, driver models $D_t$ representing driving characteristics of various agents, traffic rules $T_t$, models $G_t$ of goals or intentions of various entities, relevance classes $K_t$, and so on.

Information from a map representation $M_t$ may include, for example, lane and road geometry, road topology, lane permeability, lane markings, physical lane boundaries, crosswalks, intersections, traffic light positions, traffic signs, applicable traffic rules, and the like) in the depicted embodiment. The context $C_t$ may include time-constant object-specific properties (such as the type of an object, color, brand, age, gender, size, etc.) in the depicted embodiment, as well as time-varying higher level, non-observable variables such as desired goals (reflected in $G_t$), agents' awareness of other agents, agent driving styles (reflected in $D_t$) etc. In some embodiments, as mentioned earlier, the overall state prediction model may comprise a situation or context model corresponding to situation term 409 of the integral formulation. As input to such a situation model, one or more of (a) map information obtained from a database (b) a representation of predicted goals of one or more agents associated with respective vehicles other than the vehicle for which motion decisions are to be taken (where the representation of predicted goals may be obtained at least in part using a driver model and/or a goal model), or (c) one or more traffic rules may be provided in various embodiments. The output of the situation model may comprise representations of future situations/contexts with associated probabilities in at least some embodiments, and may be combined with the outputs of the other components of the model to generate overall predicted state representations.

In at least some embodiments, e.g., in order to reduce the amount of computation required for predicting future joint world states, respective relevance factors may be assigned to different entities and objects in the environment of the autonomous vehicle during a given time interval. For example, for obvious reasons, other vehicles which are relatively near the autonomous vehicle may in general (depending on speed etc.) be considered more relevant to the motion decisions of the autonomous vehicle that more distant vehicles which are also detectable from the autonomous vehicle, and similarly, infrastructure objects which are nearer may in general be considered more relevant than objects which are further away. As such, relative relevance factors may be associated with different classes $K_t$ of objects or moving entities in some embodiments, and such relevance factors may be used in one or more objective function(s) or loss functions associated with the machine learning model being generated to make state predictions.

In formulation 401, the situation term 409 may represent the probability distribution of the current context $C_t$ conditioned on the previous and current world state. The policy term 407 may represent the probabilities of higher-level actions taken by various entities or agents given a context and a current world state, while the physics/dynamics term 405 may represent the probabilities of changes of physical states for a given combination of action, current and previous world state, and context. In at least some embodiments as discussed below, respective machine learning models (or sub-models) may be generated corresponding to one or more of the various terms of the formulation 401.

Figure 5:
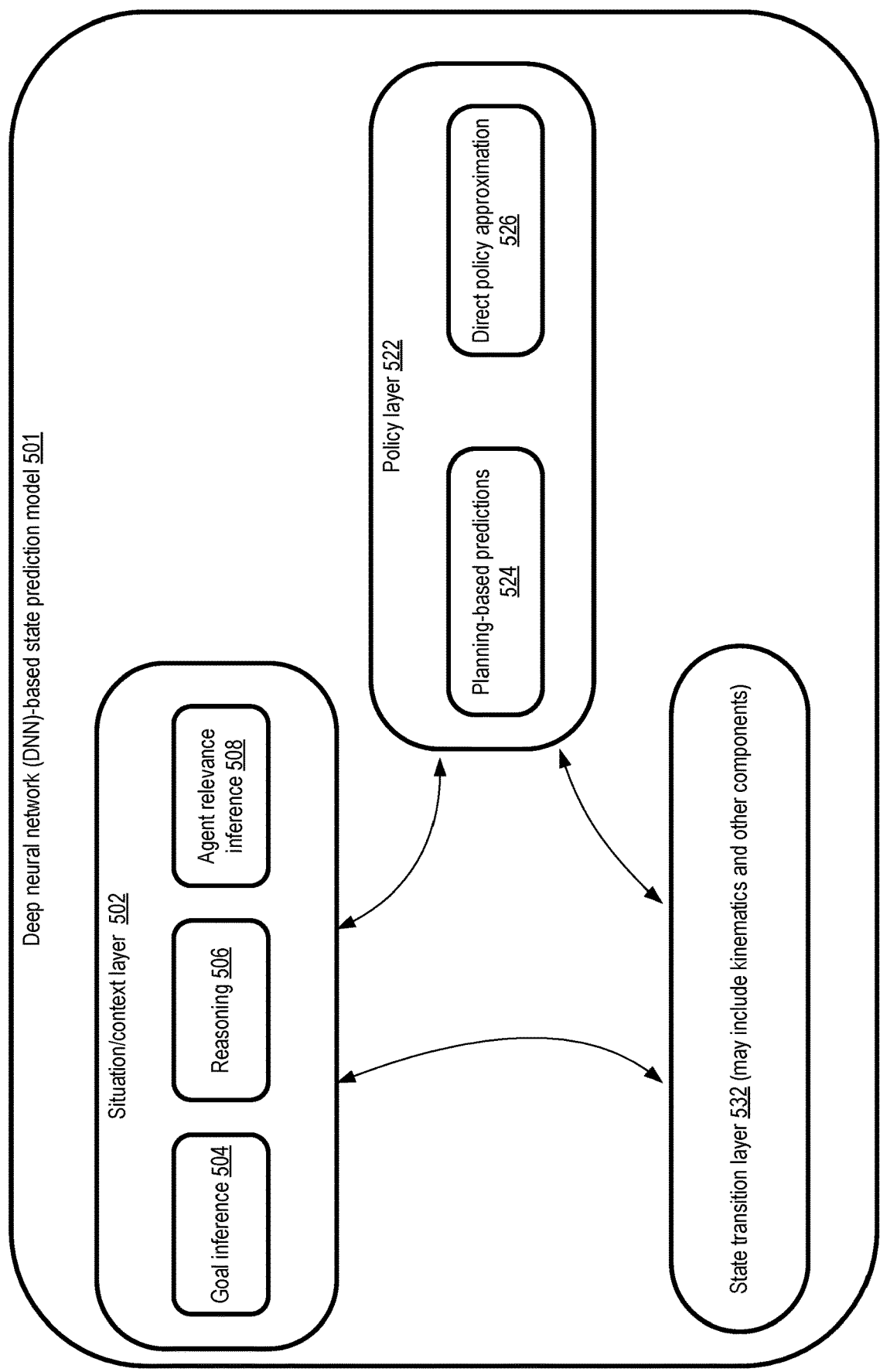
FIG. 5 illustrates example logical subcomponents or layers of a state prediction model, according to at least some embodiments.

FIG. 5 illustrates example logical subcomponents or layers of a state prediction model, according to at least some embodiments. As shown, a DNN-based state prediction model may comprise a situation or context layer 502, a policy layer 522, and a state transition layer 532 (which may include a kinematics/physical component) in the depicted embodiment. The situational layer 502 may comprise respective sub-models or components for inference regarding drivers and their goals 504, traffic rules-related reasoning 506, and/or agent relevance inference 508 in some embodiments. With respect to drivers and their goals, a sub-model may for example examine collected data to classify various drivers into aggressive, passive, or nominal drivers, and attempt to determine individual drivers' short-term, medium-term and/or long-term goals based on the observed trajectories and signals obtained from the drivers in one embodiment. With respect to traffic rules, the set of applicable rules such as speed limits, stop signs, yield signs and the like may be identified, the set of allowed actions of various agents given those rules may be identified, and a probability distribution of actions likely to be chosen (which may or may not comply with the applicable rules) may be determined or estimated for various entities in the environment. With respect to agent relevance, factors such as the distance of various agents or entities from the autonomous vehicle under consideration, the direction of movement of those agents relative to the general trajectory of the autonomous vehicle (e.g., whether another vehicle is moving further away from the autonomous vehicle or getting closer to the autonomous vehicle), the relative size of the vehicle and the autonomous vehicle, and so on, may be taken into consideration in various embodiments. Relevance scores (which may themselves be time-varying functions) may be assigned to various entities based on such factors in some embodiments, and such scores may be used, for example, in formulating objective functions and thereby limiting the set of entities to be considered when predicting future states. In some embodiments, the situational layer may comprise estimators for latent variables such as representations of goals of various entities including drivers, pedestrians, other autonomous vehicles, and so on, which may be included in the input used for training the state prediction models.

In the depicted embodiment, at least two types of techniques may be combined at the policy layer 522: planning-based predictions 524 and direct policy approximation 526. In planning-based prediction, joint reward or cost functions may be used for qualifying or scoring future states, and a sequential decision process may be modeled in which the action with the highest reward (or a small set of actions with high reward values) may be selected at each decision-making stage in some embodiments. Planning-based predictions may have to deal with large state and action spaces in various embodiments, and may also have to take into account the fact that at least some decision-making agents do not necessarily make rational (i.e., reward-maximizing) choices on at least some occasions. Furthermore, actions may be taken asynchronously with respect to one another by different agents, and may involve real-valued state spaces rather than discrete state spaces. A number of techniques may help to reduce the computational complexity of planning-based predictions in various embodiments, such as hierarchical stochastic algorithms, iterative refinement techniques in which simple prediction algorithms are used initially and complex algorithms are only invoked when needed, and maximizing the re-use of previously-computed results.

As indicated by the name, the direct policy approximation approach 526 may utilize collected data directly (e.g., instead of estimating rewards) to learn stochastic policy models in various embodiments. Predictions may be generated using recursive forward propagation of the joint state density in such embodiments, such that the learned or trained model imitates observed behavior. Recursion may be used along two dimensions in some embodiments—the time dimension, in which predictions generated for time t are used to derive predictions for time (t+1), as well as the entity or agent dimension, in which individual single agent predictions are combined to generate approximate full (multi-agent) joint state predictions. Such an approximation may be enabled in some embodiments by conditioning the single agent predictions on the full joint state. In at least one embodiment, the recursive operation of the model may comprise, for example, determining a time horizon comprising a plurality of time steps for which respective state predictions are to be obtained, and, as an initial step, generating a first prediction with respect to a state of a first moving entity with respect to a particular time step of the plurality of time steps. Subsequently, that first prediction may be used, together with one or more other predictions associated with other moving entities to generate a second prediction with respect to the state of the first entity at a future time step of the plurality of time steps. Eventually, an estimate of the state of the first entity at the end of the time horizon may be generated recursively in such embodiments using a plurality of predictions including the first prediction and the second prediction.

In various embodiments, the state transition layer 532 may include one or more models (which may be termed state transition models) which encode relatively straightforward laws or rules of physics, kinetics and/or mechanics. In one embodiment, such models may not necessarily require machine learning algorithms to be invoked. In some embodiments sub-models implementing the logic of more than one layer shown in FIG. 5 may be combined—e.g., state transition predictions may be combined with policy prediction models in one implementation, or a single model may be developed for all three layers. In at least some embodiments, machine learning models which do not include neural networks, such as regression models or the like, may be used for at least some of the layers.

Figure 6:
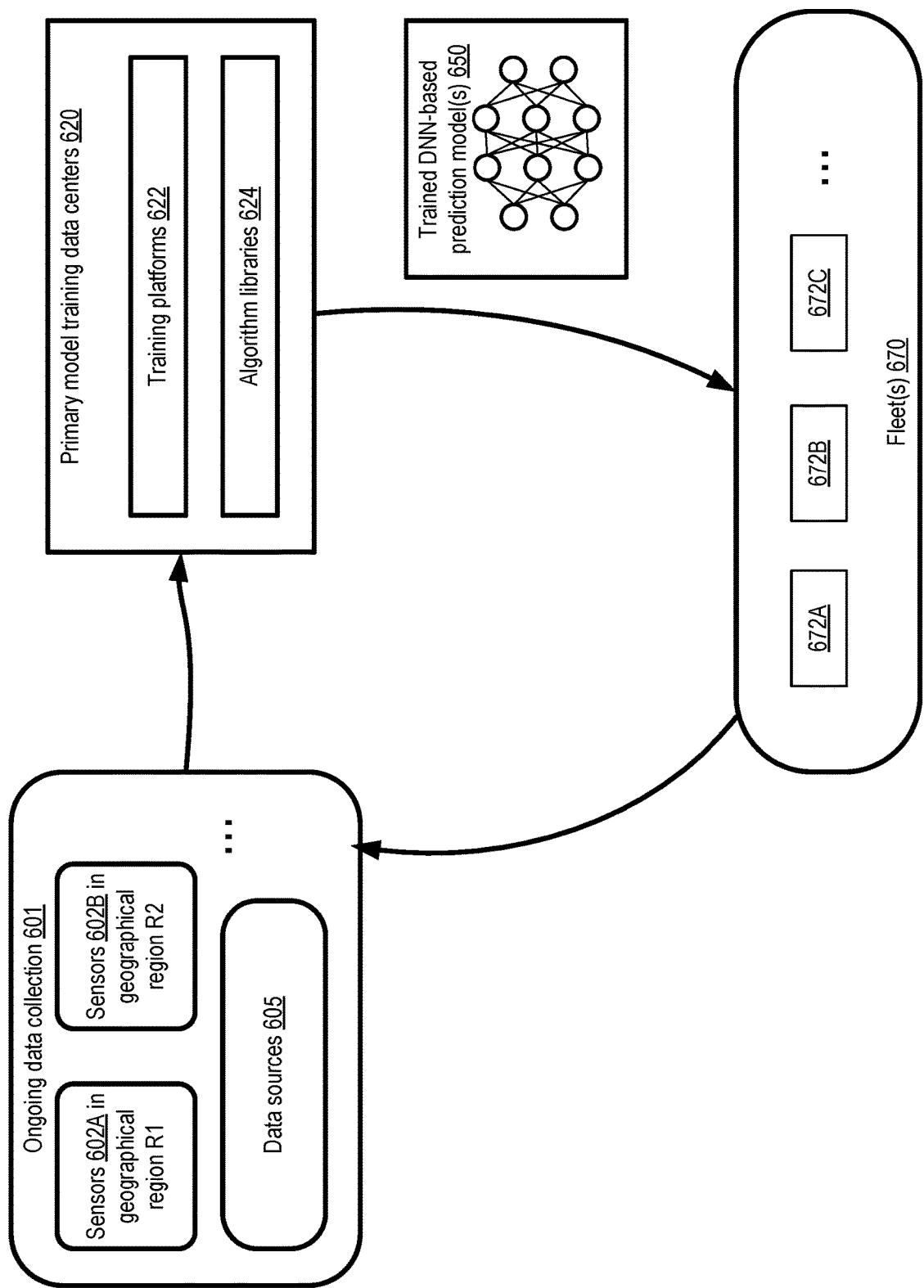
FIG. 6 illustrates an overview of example stages of developing, deploying and using state prediction models for autonomous vehicles, according to at least some embodiments.

FIG. 6 illustrates an overview of example stages of developing, deploying and using state prediction models for autonomous vehicles, according to at least some embodiments. As shown, as part of a continuous or ongoing data collection procedure 601, data about driving environments may be collected from a variety of vehicle-based sensors in numerous geographical regions such as R1 and R2. As discussed earlier, the set of sensors at a given vehicle may comprise, among others, externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices, sensors associated with vehicle motion-control subsystems such as brakes, accelerator pedals, steering wheels, and so on. In addition to conventional video and/or still cameras, in some embodiment near-infrared cameras and/or depth cameras may be used. The raw sensor data may be transformed into higher level abstractions or objects prior to further analysis in at least some embodiments, e.g., using one or more perception subsystems. In addition to the vehicle sensors, data about driving environments may also be collected from extra-vehicular data sources 605 in at least some embodiments. Such data sources may include, for example, databases of traffic laws, accident reports, mapping services and the like.

The data may be aggregated at one or more primary model training data centers 620 in the depicted embodiment. The data centers may comprise numerous computing platforms, storage platforms and the like, from which some number of training platforms 622 may be selected to train and evaluate DNN-based state prediction models 650 using any of a variety of machine learning algorithms of a library 624. Trained models 650, which may for example comprise implementations of the layers indicated in FIG. 5, may be transmitted to autonomous vehicles 672 (e.g., AV 672A-672C) of fleets 670 in the depicted embodiment. The trained models may be executed using local computing resources at the autonomous vehicles and data collected by local sensors of the autonomous vehicles, e.g., to predict joint world states at desired time horizons as discussed earlier. The state predictions may be used to generate motion control directives to achieve vehicle trajectories which meet safety, efficiency and other desired criteria mentioned earlier. At least a subset of the decisions made at the vehicle, as well as the local sensor data collected, may be transmitted back to the data centers as part of the ongoing data collection approach, and uses to improve and update the state prediction models in various embodiments. In some embodiments, updated versions of the models may be transmitted to the autonomous vehicle fleet from the data centers periodically, e.g., as improvements in the model accuracy and/or efficiency are achieved. In at least one embodiment, respective versions of state prediction models may be generated for several sub-domains—e.g., one model may be generated for large trucks, another for passenger cars, and so on, and the appropriate models may be transmitted to autonomous vehicles of different types. Similarly, in some embodiments, geography-specific models may be generated and transmitted to autonomous vehicles for execution in the corresponding regions or countries.

Figure 7:
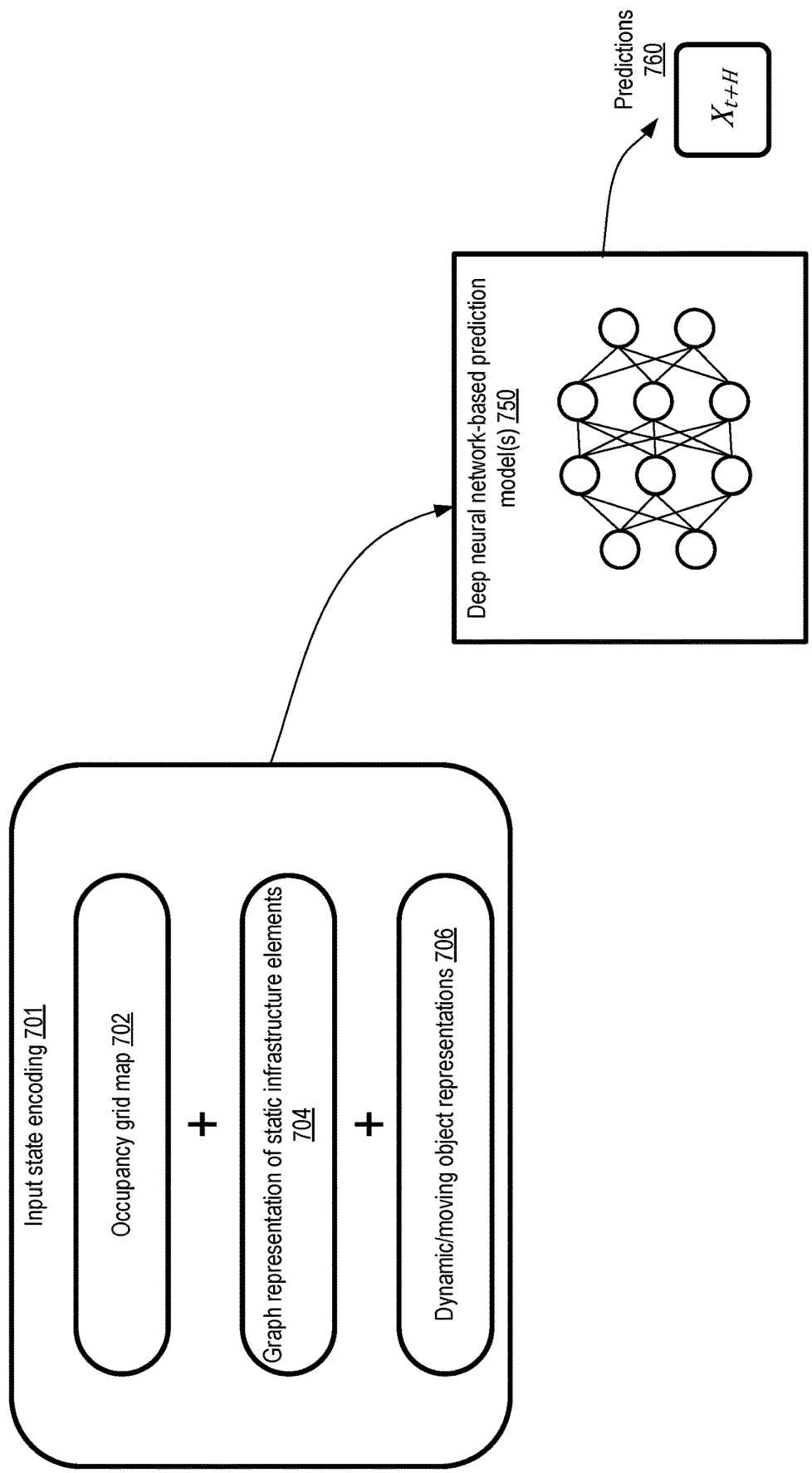
FIG. 7 illustrates an overview of aspects of input encoding which may be employed for neural network-based state prediction models, according to at least some embodiments.

As mentioned earlier, in at least some embodiments, abstract representations of the vehicle operation environment may be generated in the form of encodings that are suitable for use as inputs to deep neural network models. FIG. 7 illustrates an overview of aspects of input encoding which may be employed for neural network-based state prediction models, according to at least some embodiments. As shown, an input state encoding 701 may comprise a combination of an occupancy grid map 702, a graph representation 704 of static infrastructure elements and their relationships, as well as representations 706 of a potentially varying number of moving objects in the depicted embodiment. In some embodiments, as mentioned earlier, occupancy grid maps may not be used.

The occupancy grid map 702 may represent a discretized view of a selected area around a vehicle, e.g., as though seen from a birds-eye perspective. The granularity of the grid may vary, and the manner in which the positions of various recognized or known shapes/objects as well as unrecognized shapes/objects are encoded within the grid may also vary in different embodiments. The occupancy grid map may provide a preliminary layer of information about the surroundings of an autonomous vehicle in various embodiments, with additional detail being added in by the remaining layers. In some embodiments, the occupancy grid map layer may be generated at least in part using a set of pre-identified or pre-defined object classes—e.g., street signs, trees, etc., whose prototypical shapes are well-known. Locations of objects whose characteristics do not appear to match characteristics of a member of the set of pre-identified objects (and may thus represent obstacles which may require extra caution) may also be included in the occupancy grid map in various embodiments. In various embodiments, occupancy grid maps may include representations of structured environment elements such as road lanes, intersections etc., as well as less structured or unstructured environment elements such as parking lots.

A graph data structure or representation 704 of static infrastructure components may comprise a plurality of nodes representing respective infrastructure elements, with at least some pairs of the nodes being connected by edges representing logical relationships. The nodes may represent, for example, lane segments, traffic signs, pedestrian walkways, bicycle lanes, parking spots, and so on, and the edges may indicate topological or geometric constraints or attributes of the nodes linked by the edges.

The combination of the occupancy grid map 702 and the static infrastructure graph 704 may be further enhanced by adding dynamic object representations representing, for example, the autonomous vehicle for which motion control decisions are to be generated, other autonomous or human-operated vehicles, pedestrians, bicyclists, and so on. In some embodiments respective state vectors may be generated for each dynamic object or entity. The total number of relevant dynamic objects in the vicinity of the autonomous vehicle may change over time, so the representation may be designed to handle varying numbers of dynamic objects in various embodiments. In some embodiments, a padded vector technique may be used, in which a maximum number or upper bound of dynamic objects that can be represented may be chosen, and if the number happens to be less than the maximum number during a given time interval, padded (e.g., all-zero) vectors may be used for the "missing" objects. If the total number of dynamic or moving entities detectable in the environment exceeds the maximum, some may be discarded from the representation, e.g., based on relevance criteria or factors such as proximity, size, speed, and the like. In another approach towards handling varying numbers of dynamic objects, a mapping or embedding from a first representation space to a second representation space may be used, in which the dimensionality of the two representation spaces may differ. For example, if there are 20 moving entities to be represented, the states of the 20 entities may be mapped to a space with a smaller dimensionality (e.g., 10-dimensional space) in some embodiments, while if there are no more than 10 objects to be represented, the mapping or embedding transformation may not be required. In a third approach, a neural network model in which aggregation functions are implemented (e.g., at pooling layers or via recurrent connections) may be used for capturing representations of the dynamic objects. The aggregation functions may be invariant of the spatial ordering (e.g., by distance from the autonomous vehicle) of the dynamic objects in some embodiments, while in other embodiments the aggregation functions may take the ordering into account.

Input state encodings 701 in which stationary and moving objects as well as their relationships are represented at the object level may enable faster training of DNN-based prediction models 750 in at least some embodiments than if input were presented in more primitive form such as raw pixel data captured from cameras. The models 750 may be trained using the encodings 701 to generate joint state predictions 760 using a variety of learning techniques as discussed below.

Figure 8:
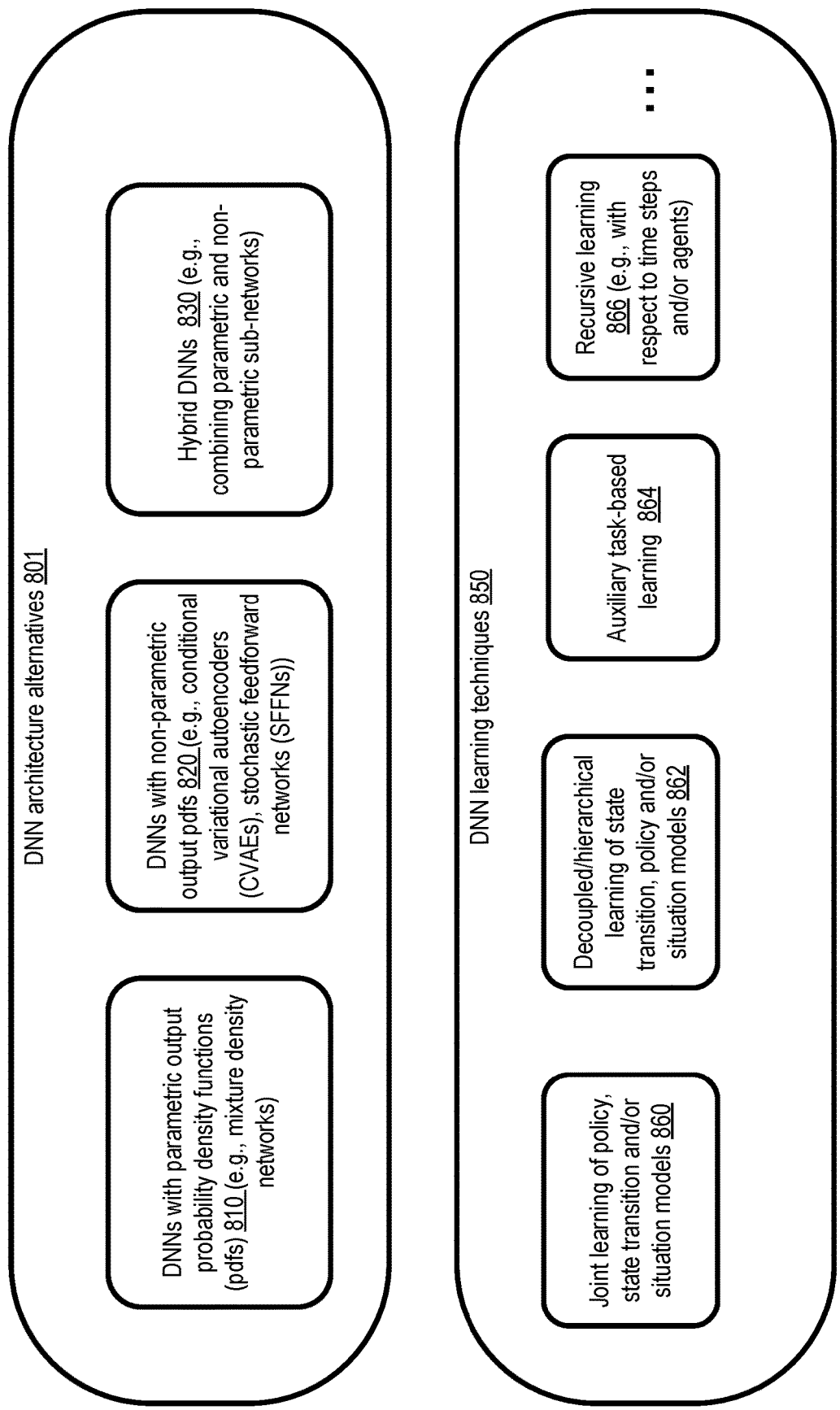
FIG. 8 illustrates examples of alternative neural network architectures and learning techniques which may be employed for models used for vehicle decision making, according to at least some embodiments.

FIG. 8 illustrates examples of alternative neural network architectures and learning techniques which may be employed for models used for vehicle decision making, according to at least some embodiments. In some embodiments, neural network models 810 which produce parametric probability density functions as output may be employed—that is, the predicted state probabilities may be expressed fully using parameters of the distributions such as means and variances of the distributions. The training objective may comprise maximizing the likelihood of the parametric pdf generating the data. In at least one such embodiment, a mixture density network (MDN) may be used, and the output may comprise a mixture of Gaussian pdfs. In other embodiments, neural network models which generate non-parametric pdfs 820 may be utilized. In the latter scenario, it may not be possible to express the predicted state probabilities using a set of statistical parameters; instead, samples of the output predictions may be drawn to approximate the pdf. Examples of non-parametric pdf-generating neural network models may include, for example, conditional variational auto-encoders (CVAEs), stochastic feed forward networks and the like. In at least one embodiment, a hybrid DNN model 830 which includes sub-networks that generate parametric pdfs as well as non-parametric pdfs may be employed.

A number of different approaches or techniques 850 with respect to learning of the DNN-based model may be employed in different embodiments. In one embodiment, the state transition, policy (action prediction) and situation/context models may be learned as a single joint model, as indicated by element 860 of FIG. 8. In another approach, indicated by element 8862, the learning corresponding to the different layers may be decoupled or performed in a hierarchical manner. For example, respective models may be trained for the situation/context layer, the policy layer and/or the state transition layer in some implementations. In another embodiment, a hierarchical learning technique may be used, in which a DNN-based model may first be trained to recognize infrastructure objects, and then, in a subsequent stage, the model may be extended to learn how objects move within the environment comprising the infrastructure. In such an embodiment, a first phase of training may comprise infrastructure-focused learning, in which at least a portion of a first neural network-based model is trained to learn representations of one or more infrastructure components. A second phase of training may comprise moving entity-focused learning, in which a version of at least the portion of the first neural network-based model resulting from the first phase is trained to predict actions of one or more moving entities. Other phased approaches towards training may be taken in different embodiments, in which the learning process is sub-divided into distinct stages of learning about respective aspects of future joint states.

In some embodiments, as indicated by element 864, respective auxiliary tasks may be identified corresponding to different aspects of the overall state prediction problem, and a technique called multi-task learning may be employed in which a common set of input data (and/or a shared set of DNN layers) are used for the different tasks. One auxiliary task may, for example, comprise recognizing various infrastructure elements, e.g., by transforming raw input data representing infrastructure elements into internal representations, and then using the internal representations to reconstruct or learn the input representations of the infrastructure. Such a transformation-reconstruction approach may be referred to as an autoencoder-decoder technique in some embodiments. A second auxiliary task may, for example, comprise predicting probable actions of one or more agents in some embodiments. In various embodiments, recursive learning techniques may be applied with respect to time and/or with respect to agents, as indicated by element 866. For example, with respect to time, the state at time T may be used to predict the state at time t+1, the predicted state at time t+1 may be used to predict the state at time t+2, and so on until the desired time horizon is reached, with each recursive step being conditioned in the joint state determined in the previous step. With respect to individual agents, the state of individual agents may be predicted independently in some embodiments, and then used to predict the combined state of multiple agents. In the latter approach, a single agent prediction at an intermediate step may be conditioned on the full joint state. In at least some embodiments, the loss function(s) used for the DNN model may be modified to incorporate notions of relevance—e.g., higher relevance factors or scores may be assigned to other vehicles which are nearer to the autonomous vehicle for which decisions are being made, or to vehicles which are approaching faster or with greater total momentum. It is noted that several learning approaches may be combined in a given embodiment—that is, the example techniques indicated in FIG. 8 are not intended to be mutually exclusive.

Figure 9:
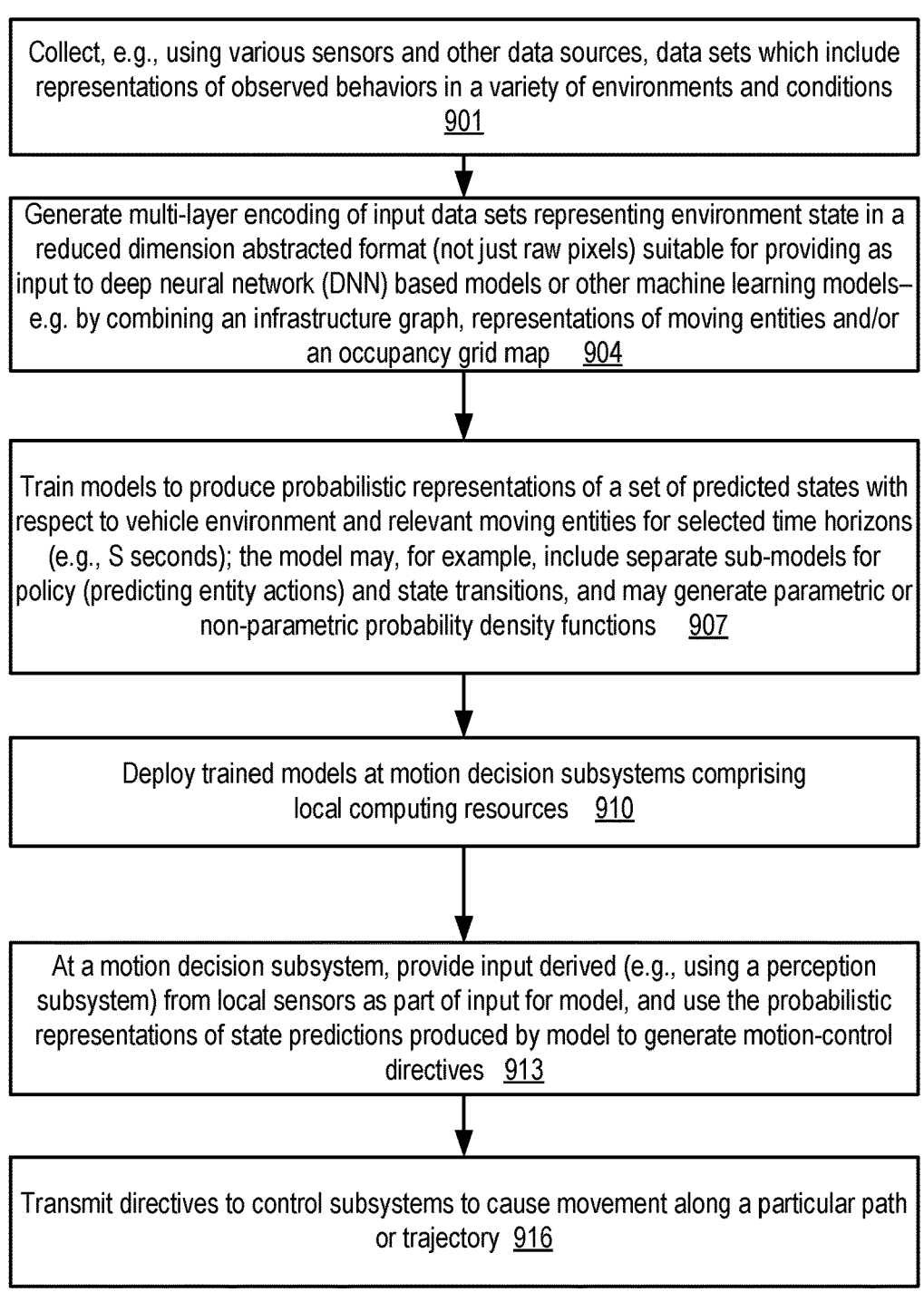
FIG. 9 is a flow diagram illustrating aspects of operations which may be performed to generate state predictions used to help plan and control the movement of an autonomous vehicle, according to at least some embodiments.

FIG. 9 is a flow diagram illustrating aspects of operations which may be performed to generate state predictions used to help plan and control the movement of an autonomous vehicle, according to at least some embodiments. As shown in element 901, using various vehicle-attached sensors, non-vehicular sensors and other data sources such as map databases, legal databases, accident records and the like, data sets which include observed behaviors of vehicle drivers and autonomous vehicles in a variety of environments and driving conditions may be collected over various time intervals in the depicted embodiment.

In at least some embodiments, a multi-layer encoding of at least a portion of the data sets, representing the driving environment state in a reduced-dimension or abstracted format (i.e., not just in the form of raw pixels) may be generated (element 904). In some implementations, generating an encoding of a given driving environment associated with one or more vehicles may comprise, for example, combining an occupancy grid map, an infrastructure graph and representations of moving entities. In at least one embodiment, occupancy grid maps may not be included in the encodings. The encoding may be formatted such that it is suitable as input for a deep neural network in various embodiments, e.g., using matrices or vectors of numerical quantities.

Using the encodings as well as observations obtained from the environment and/or representations of latent variables (such as goals of drivers and other entities which may be obtained from external estimators), a deep neural network-based state prediction model may be trained in at least some embodiments (element 907). The model may, for example, generate probabilistic representation of a set of predicted states (such as a joint state density function) with respect to vehicle environment elements and relevant moving entities for selected time horizons (e.g., S seconds). In some embodiments, separate sub-models for policy (predicting entity actions) and state transitions (e.g., including but not limited to position and other physical changes) may be employed; in other embodiments, a single composite model may be trained. The model may generate parametric probability density functions (pdfs) representing the joint state forecasts in some embodiments. In other embodiments, models that produce non-parametric pdfs (or a combination of models that generate parametric pdfs and models that generate non-parametric pdfs) may be used. Models that generate parametric pdfs may include mixture density networks (MDNs), while models that generate non-parametric output may comprise, among others, conditional variational auto-encoders (CVAEs) or feedforward networks.

The trained models may be deployed to a fleet of autonomous vehicles in at least some embodiments (element 910), e.g., from a data center at which the models were trained. Individual vehicles may comprise sufficient computing resources to execute the trained models locally in various embodiments. In one embodiment, not all the parameters (e.g., weights, biases and other parameters of the nodes of the DNN) may be finalized before the model is transferred to the autonomous vehicles—instead, some of the parameters may be learned at the vehicles themselves. In some embodiments, state prediction models may be trained entirely within the autonomous vehicles, without the use of data center resources.

At a motion decision subsystem of a given autonomous vehicle, input derived at least in part from local sensors via a perception subsystem may be fed to the trained DNN model, and the joint state predictions produced by DNN model to generate motion-control directives (element 913) in the depicted embodiment. In some embodiments, as discussed earlier, the motion decision subsystem may comprise a behavior planner responsible for identifying relatively long-term actions to be taken, as well as a motion selector responsible for controlling short-term movements of the vehicle. In at least one such embodiment, output from the trained model may be provided to both the motion selector and to the behavior planner.

The directives may be sent from the motion decision subsystem to various low-level motion control subsystems or components (e.g., braking components, acceleration components, turning components and so on) of the vehicle to achieve desired trajectories for the vehicle (element 916). In at least one embodiment, representations of at least some of the decisions reached at the motion decision subsystem, as well as the input used for reaching those decisions and/or the state predictions generated by the trained models may be collected and transmitted to the data centers where the models are trained—e.g., the process of collecting data from real driving environments and using the data to improve state prediction models may be continuous or ongoing.

It is noted that in various embodiments, at least some operations other than those illustrated in the flow diagram of FIG. 9 may be used to implement the state prediction and decision making techniques for vehicle motion control described above. Some of the operations shown may not be implemented in some embodiments or may be implemented in a different order, or in parallel rather than sequentially.

Figure 10:
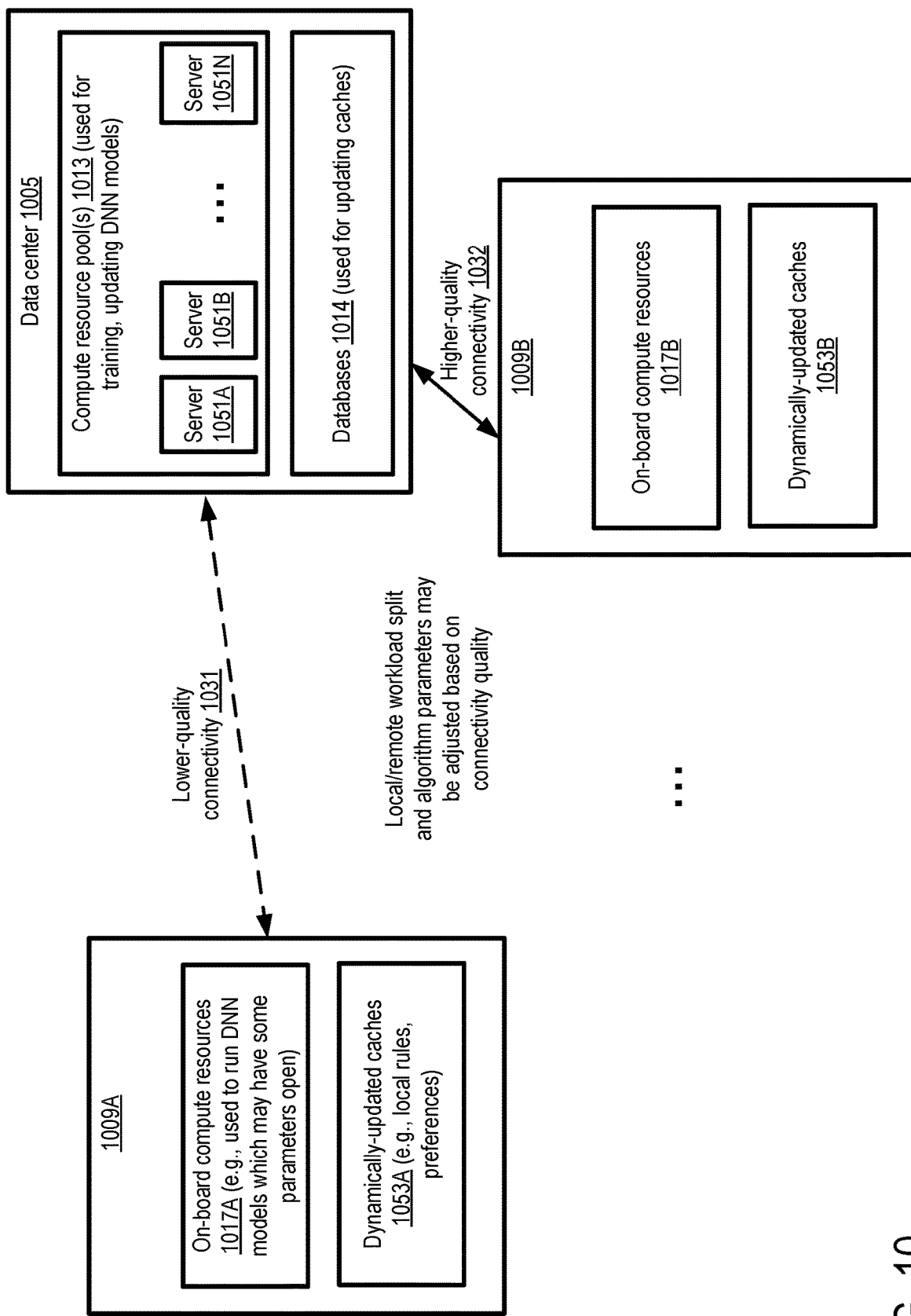
FIG. 10 illustrates examples of the distribution of motion decision activities between computing resource local to autonomous vehicles and remote data centers, according to at least some embodiments.

In some embodiments, computations of the decision-making components and/or state prediction components associated with an autonomous vehicle may be performed in a distributed manner, e.g., using local resources located in the vehicle itself as well as remote resources. FIG. 10 illustrates examples of the distribution of motion decision activities between computing resource local to autonomous vehicles and remote data centers, according to at least some embodiments. Two autonomous vehicles 1009A and 1009B are shown in the depicted embodiment, each of which is configured to utilize computing resources at a remote data center 1005 to perform some subset of the processing required for decision making. The data center 1005 may comprise, for example, one or more pools 1013 of compute resources, such as servers 1051A-1051N. In some embodiments, at least some resource pools 1013 or individual servers 1051 may be optimized for performing machine learning operations—e.g., some servers may use graphical processing units (GPUs) more suitable for neural network algorithms than conventional CPUs. The resources of the data center may be used to train and run at least some of the machine learning models (including for example the kinds of deep neural networks discussed above) used by the local decision making components of the autonomous vehicles; thus, the decision making components in effect may comprise some on-board components local to the vehicles and some remote components in the depicted embodiment. In addition to computing resources in pools 1013, the data center may also include one or more databases 1014 containing location-specific or region-specific information which may be useful for decision making at the autonomous vehicles 1009.

Each of the autonomous vehicles 1009 may comprise a respective set of on-board computing resources 1017 (e.g., resources 1017A and 1017B of vehicles 1009A and 1009B respectively), as well as a respective local cache 1053 (e.g., dynamically-updated caches 1053A and 1053B of vehicles 1009A and 1009B respectively). Depending for example on the current location of a vehicle 1009 and/or the identities of the current occupants, the caches 1053 may be updated periodically from the data center's databases 1014. For example, city-specific or neighborhood-specific traffic rules may be loaded into the caches as needed, occupant preferences (such as the relative weights to be assigned to different factors when selecting actions to be taken) may be updated when occupants change, and so on. It is noted that not all the autonomous vehicles may incorporate equivalent local computing resources—e.g., some vehicle models may contain more powerful processing devices and/or larger caches than others.

Based at least in part on the quality of the network connectivity between the autonomous vehicles 1009 and the data center, different relative amounts of motion decision-related processing may be performed locally using on-board resources versus remotely in various embodiments. In general, the autonomous vehicles may attempt to establish and maintain high-bandwidth and low-latency communication channels with the data center 1005. If the quality of the connectivity is high, as indicated by arrow 1032 in the case of vehicle 1009B, data may be transmissible at a high rate and with high fidelity to/from the data center 1005, and as a result a larger fraction of the planning tasks, including state prediction, may be performed at the data center. In contrast, if the connectivity is of lower quality (as indicated by arrow 1031 with respect to vehicle 1009A), a larger fraction of the decision-making logic may have to be implemented using on-board resources. In at least one embodiment, the tasks of collecting and processing sensor data, and the motion selector's operations, may be performed using local computing resources, while it may be possible (although not required) to perform at least a fraction of the state prediction functions and/or behavior planner functions at the data center. In various embodiments, because of the possibility of poor connectivity with the remote data center, the decision-making components of the vehicle may be designed such that they are capable of planning the vehicle's movements appropriately and safely even if communications with the data center are not feasible for extended periods of time.

Figure 11:
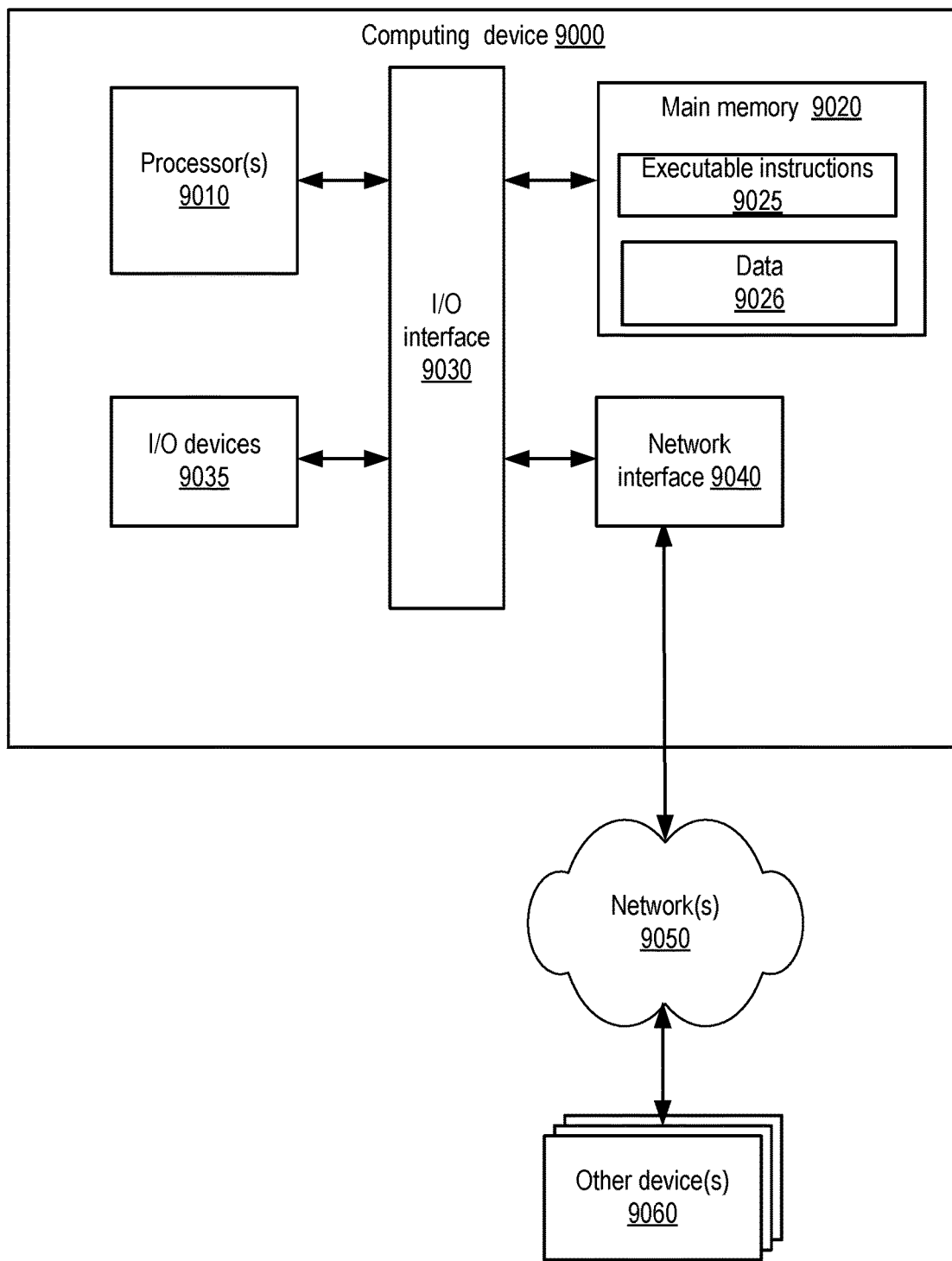
FIG. 11 is a block diagram illustrating an example computing device that may be used in at least some embodiments.

In at least some embodiments, a server that implements a portion or all of one or more of the state prediction and motion decision-making technologies described herein, including the techniques to collect, obtain or process sensor signals of various types, to train and execute machine learning algorithms including neural network algorithms and the like, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising: performing, at one or more computing devices:
   obtaining a first encoding of a vehicle operation environment, wherein the first encoding comprises a combination of:
   (a) a representation of a plurality of moving entities,
   (b) an infrastructure graph, distinct from the representation of the plurality of moving entities, wherein the infrastructure graph comprises a plurality of nodes representing respective static infrastructure components and one or more edges linking the nodes, wherein a particular edge of the one or more edges indicates a relationship between a pair of nodes of the plurality of nodes, and
   (c) an occupancy grid map;
   training, using at least the first encoding, a first machine learning model to produce a first probabilistic representation of a set of predicted states of the environment, wherein training the first machine learning model comprises:
   (a) a first phase of training using the infrastructure graph, wherein at least a portion of the first machine learning model is trained during the first phase to learn representations of one or more infrastructure components; and
   (b) a second phase of training, using at least the portion of the first machine learning model resulting from the first phase, to train the first machine learning model to predict actions of the plurality of moving entities using the representation of the plurality of moving entities; and
   storing a trained version of the first machine learning model, wherein output produced by the trained version is usable by one or more motion decision making components of a vehicle to generate motion control directives of the vehicle.

2. The method as recited in claim 1, wherein the first machine learning model comprises a first neural network model that comprises at least a policy model predicting the respective set of actions taken by a plurality of moving entities, and the method further comprising generating a motion-control directive for the vehicle based at least in part on an output of a state transition model predicting at least one or more physical state changes of one or more entities.

3. The method as recited in claim 2, wherein the state transition model includes a transition model of one or more of: the vehicle, one or more traffic rules, one or more traffic signals, a pedestrian head orientation, or pedestrian pose, and wherein a particular physical state change of the one or more physical state changes includes one or more of: a position, an orientation, a velocity, an acceleration, a current lane, or a traffic light state.

4. The method as recited in claim 1, wherein the first encoding comprises the occupancy grid map overlaid with the representation of the plurality of moving entities and the infrastructure graph.

5. The method as recited in claim 4, wherein the occupancy grid map comprises respective representations of one or more of: (a) an obstacle, (b) a member of a set of pre-defined objects, (c) a structured element of the environment, or (d) an unstructured element of the environment.

6. The method as recited in claim 1, wherein the plurality of nodes includes a first node representing a first static infrastructure component comprising one or more of: (a) a lane segment of a road, (b) an intersection, (c) a traffic sign, (d) a traffic signal, or (e) a pedestrian walkway.

7. The method as recited in claim 6, wherein the particular edge of the one or more edges indicates one or more of: (a) a geometric constraint associated with a pair of static infrastructure components including the first static infrastructure component, (b) a topological constraint associated with a pair of static infrastructure components, or (c) one or more attributes associated with a pair of static infrastructure components.

8. The method as recited in claim 1, wherein the representation of the plurality of moving entities comprises one or more of: (a) a padded vector with an upper-bounded capacity, (b) a mapping of respective representations of the moving entities from a source space to a target space with a different dimensionality than the source space, (c) an output of an aggregation layer of a neural network model, or (d) an output obtained from a neural network model comprising one or more recurrent connections.

9. The method as recited in claim 1, wherein the first probabilistic representation comprises a joint density function.

10. The method as recited in claim 1, wherein the first probabilistic representation comprises one or more of: (a) a parametric probability density function or (b) a non-parametric probability density function.

11. A system, comprising:
    a machine learning model trainer comprising one or more computing devices;
    wherein the machine learning model trainer is configured to:
    obtain a first encoding of a vehicle operation environment, wherein the first encoding comprises a combination of:
    (a) a representation of a plurality of moving entities,
    (b) an infrastructure graph, distinct from the representation of the plurality of moving entities, wherein the infrastructure graph comprises a plurality of nodes representing respective infrastructure components and one or more edges linking the nodes, wherein a particular edge of the one or more edges indicates a relationship between a pair of nodes of the plurality of nodes, and
    (c) an occupancy grid map;
    train, using at least the first encoding, a first machine learning model to produce a first probabilistic representation of a set of predicted states of the environment, wherein training the first machine learning model comprises:
    (a) a first phase of training using the infrastructure graph, wherein at least a portion of the first machine learning model is trained during the first phase to learn representations of one or more infrastructure components; and
    (b) a second phase of training, using at least the portion of the first machine learning model resulting from the first phase, to train the first machine learning model to predict actions of the plurality of moving entities using the representation of the plurality of moving entities; and
    store a trained version of the first machine learning model, wherein output produced by the trained version is usable by one or more motion decision making components of a vehicle to generate motion control directives of the vehicle.

12. The system as recited in claim 11, wherein the model trainer is configured to train the first machine learning model using one or more observations of the state of the vehicle operation environment.

13. The system as recited in claim 12, wherein the one or more observations comprise a temporal sequence of observations.

14. The system as recited in claim 11, wherein the model trainer is configured to train the first machine learning model using one or more latent variables obtained from an estimator, wherein a particular latent variable of the one or more latent variables represents a goal of a moving entity of the plurality of moving entities.

15. The system as recited in claim 11, wherein at least one computing device of the one or more computing devices is located at a data center, wherein the model trainer is configured to:
cause the trained version of the first machine learning model to be transmitted to the vehicle.

16. A non-transitory computer-accessible storage medium storing program instructions that when executed on one or more processors cause the one or more processors to:
obtain a first encoding of a vehicle operation environment, wherein the first encoding comprises a combination of:
a representation of a plurality of moving entities,
an infrastructure graph, wherein the infrastructure graph comprises a plurality of nodes representing respective infrastructure components and one or more edges linking the nodes, and wherein a particular edge of the one or more edges indicates a relationship between a pair of nodes of the plurality of nodes, and
an occupancy grid map;
train, using at least the first encoding, a first machine learning model to produce a first probabilistic representation of a set of predicted states of the environment, wherein training the first machine learning model comprises:
(a) a first phase of training using the infrastructure graph, wherein at least a portion of the first machine learning model is trained during the first phase to learn representations of one or more infrastructure components; and
(b) a second phase of training, using at least the portion of the first machine learning model resulting from the first phase, to train the first machine learning model to predict actions of the plurality of moving entities using the representation of the plurality of moving entities; and
store a trained version of the first machine learning model, wherein output produced by the trained version is usable by one or more motion decision making components of a vehicle to generate motion control directives of the vehicle.

17. The non-transitory computer-accessible storage medium as recited in claim 16, wherein the first machine learning model comprises at least one stochastic generative neural network model.

18. The non-transitory computer-accessible storage medium as recited in claim 16, wherein the program instructions when executed on the one or more processors cause the one or more processors to:
determine a time horizon comprising a plurality of time steps for which respective probabilistic representations of state are to be predicted;
generate, using the first machine learning model, a first prediction corresponding to a particular time step of the plurality of time steps;
utilize the first prediction and one or more other predictions associated with respective entities of the plurality of moving entities to generate a second prediction corresponding to a subsequent time step of the plurality of time steps; and
generate, using a plurality of predictions including the first prediction and the second prediction, a probabilistic representation of a state of at least a first entity of the plurality of moving entities corresponding to the end of the time horizon.

19. The non-transitory computer-accessible storage medium as recited in claim 16, wherein the program instructions when executed on the one or more computing devices cause the one or more processors to:
send the trained version of the first machine learning model to be transmitted to the vehicle.

20. The non-transitory computer-accessible storage medium as recited in claim 16, wherein the first machine learning model comprises respective portions designated to learning one or more auxiliary tasks, including a first auxiliary task comprising learning representations of one or more infrastructure components.

* * * * *